(12) United States Patent
Hirota et al.

(10) Patent No.: US 7,856,701 B2
(45) Date of Patent: Dec. 28, 2010

(54) MANUFACTURING METHOD OF A COIL ASSEMBLY

(75) Inventors: Yutaka Hirota, Tokyo (JP); Yoshihiro Harada, Tokyo (JP); Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 526 days.

(21) Appl. No.: 11/222,865

(22) Filed: Sep. 12, 2005

(65) Prior Publication Data

US 2006/0005376 A1 Jan. 12, 2006

Related U.S. Application Data

(62) Division of application No. 10/359,095, filed on Feb. 6, 2003, now Pat. No. 6,819,570.

(51) Int. Cl.
*H02K 15/00* (2006.01)
*H01R 43/00* (2006.01)

(52) U.S. Cl. .......................... 29/596; 29/597

(58) Field of Classification Search ............. 29/596–97, 29/732–35; 310/254, 184, 201; 72/481, 72/217, 135, 137
See application file for complete search history.

(56) References Cited

U.S. PATENT DOCUMENTS

| | | | | |
|---|---|---|---|---|
| 2,454,290 A | * | 11/1948 | Payne | 72/217 |
| 3,227,195 A | * | 1/1966 | Stegmann | 140/103 |
| 3,281,916 A | * | 11/1966 | Goldsmith | 29/33 F |
| 3,493,016 A | * | 2/1970 | Ott | 140/71 R |
| 4,037,072 A | * | 7/1977 | Johnson | 219/56 |
| 4,044,583 A | * | 8/1977 | Kinney, Jr. | 72/137 |
| 4,450,708 A | * | 5/1984 | King | 72/481.5 |
| 4,491,003 A | * | 1/1985 | Messick et al. | 72/137 |
| 4,646,550 A | * | 3/1987 | King et al. | 72/301 |
| 4,739,643 A | * | 4/1988 | Kuriyama et al. | 72/306 |
| 4,922,741 A | * | 5/1990 | Bridges et al. | 72/306 |
| 5,548,989 A | * | 8/1996 | Howe et al. | 72/298 |
| 5,792,984 A | * | 8/1998 | Bloom | 174/564 |
| 5,926,940 A | * | 7/1999 | Toh et al. | 29/596 |
| 6,376,961 B2 | * | 4/2002 | Murakami et al. | 310/184 |
| 6,420,664 B1 | * | 7/2002 | Muramatsu et al. | 174/262 |
| 6,640,836 B1 | * | 11/2003 | Haubert et al. | 140/3 CA |
| 6,715,202 B2 | * | 4/2004 | Beaver | 29/727 |
| 6,806,611 B2 | * | 10/2004 | Bharaj et al. | 310/208 |
| 2003/0084570 A1 | * | 5/2003 | Beaver | 29/890.035 |
| 2004/0158985 A1 | * | 8/2004 | Beaver | 29/890.053 |

\* cited by examiner

*Primary Examiner*—A. Dexter Tugbang
*Assistant Examiner*—David P Angwin
(74) *Attorney, Agent, or Firm*—Sughrue Mion, PLLC

(57) ABSTRACT

A manufacturing method includes a step of setting prescribed dimensions L and p, a wire feeding step of feeding a wire on a turning base surface by the dimension L, a turning step of turning the wire on the turning base surface to thereby form a first turning portion, a straight first portion, a second turning portion and a straight second portion, and a pushing step of pushing the straight first portion or the straight second portion so that it goes away from the turning base surface by the dimension p. A manufacturing apparatus that executes the above steps is also disclosed.

15 Claims, 20 Drawing Sheets

FIG. 5
(a) 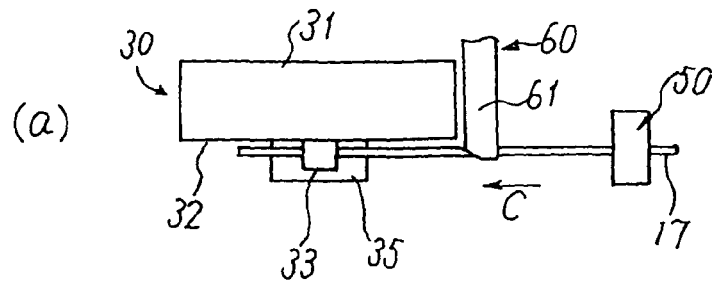
(b) 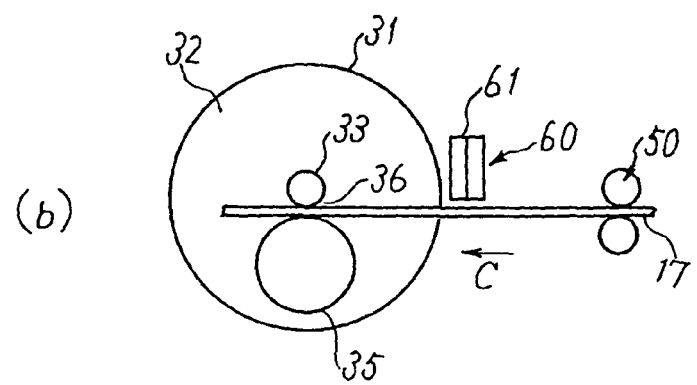
FIG. 6
(a) 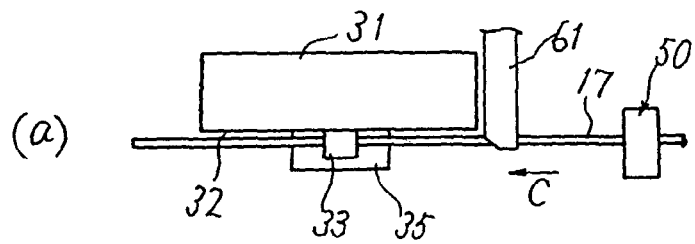
(b) 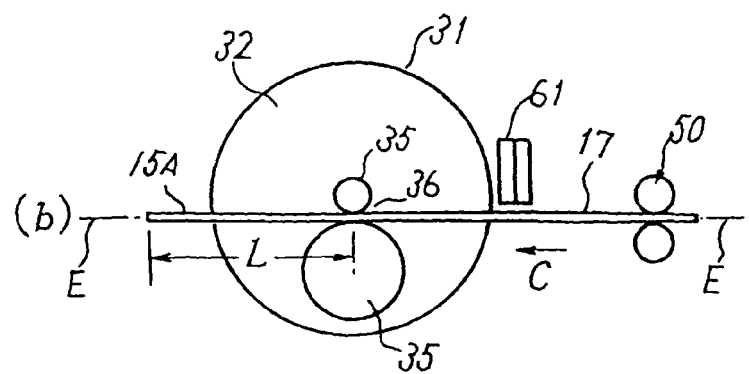

MANUFACTURING METHOD OF A COIL ASSEMBLY

This is a divisional of application Ser. No. 10/359,095 filed Feb. 6, 2003 now U.S. Pat. No. 6,819,570. The entire disclosure of the prior application is hereby incorporated by reference. The present invention relates to a manufacturing method of a coil member of a rotary electric machine such as a vehicular AC generator that is mounted on a car, a truck, or the like, a manufacturing method of a coil assembly that is an assembly of coil members each being the above one, and a manufacturing apparatus for the above coil member.

BACKGROUND OF THE INVENTION

1. Field of the Invention

The present invention relates to a manufacturing method of a coil member of a rotary electric machine such as a vehicular AC generator that is mounted on a car, a truck, or the like, a manufacturing method of a coil assembly that is an assembly of coil members each being the above one, and a manufacturing apparatus for the above coil member.

2. Description of the Related Art

The present assignee proposed a technique for increasing the mass-productivity of the above-kind of coil member of a rotary electric machine and coil assembly in U.S. Pat. No. 6,376,961 (in particular, line 58 of column 11 to line 12 of column 12, and FIG. 8). In this related art technique, a coil assembly of a rotary electric machine has a plurality of coil combinations each being a combination of two coil members. Each coil member is manufactured by turning a wire continuously. This technique can provide higher mass-productivity than in a case that many conductor segments are joined to each other.

This related art reference proposes a manufacturing method in which a plurality of wires are wound simultaneously in spiral form by using a pair of plate-like winding cores shown in FIG. 8 of the reference. Each plate-like winding core has, on the outer surface, a plurality of projections for restraining a plurality of wires. This method using such plate-like winding cores can form a plurality of (e.g., 12) coil members simultaneously by winding the same number of wires on the pair of plate-like winding cores and folding those sequentially.

However, in this related art technique, the projections that are provided on the outer surface of each of the plate-like winding cores have a fixed interval. Therefore, it is difficult to change the pitch of each of a plurality of coil members, that is, the interval between two adjoining straight portions. To adjust the length of straight portions, it is necessary to prepare plural pairs of plate-like winding cores having different widths and replace one pair with another; the length of straight portions cannot be adjusted easily either.

SUMMARY OF THE INVENTION

An object of the present invention is to provide an improved manufacturing method of a coil member of a rotary electric machine which can easily adjust the pitch and the length of straight portions of the coil member.

Another object of the invention is to provide an improved manufacturing method of a coil assembly of a rotary electric machine which can easily adjust the pitch and the length of straight portions of each of coil members of the coil assembly.

A further object of the invention is to provide an improved manufacturing apparatus of a coil member of a rotary electric machine which can easily adjust the pitch and the length of straight portions of the coil member.

The invention provides a manufacturing method of a coil member of a rotary electric machine including a winding step of forming a first turning portion, a straight portion, and a second turning portion in at least one wire. The winding step includes next steps: a step of setting prescribed dimensions L and p; a first turning step of forming the first turning portion by turning the wire on a turning base surface; a wire feeding step of advancing the wire by the prescribed dimension L after the first turning step; a second turning step of turning, after the wire feeding step, the wire on the turning base surface in the same direction as the wire was turned in forming the first turning portion, to thereby form the second turning portion and form the straight portion between the first turning portion and the second turning portion; and a pushing step of pushing, after the second turning step, the straight portion so that the straight portion goes away from the turning base surface by the prescribed dimension p.

According to this manufacturing method of the coil member of the rotary electric machine, the prescribed dimensions L and p can be changed easily and hence a coil member can be manufactured while the length and the pitch of straight portions of the coil member are changed easily when necessary.

The invention also provides a manufacturing method of a coil assembly of a rotary electric machine in which the coil assembly includes a plurality of coil members each of which is formed by a winding step of winding a wire so as to form a plurality of first portions, a plurality of second portions, a plurality of first turning portions each of which connects one of the first portions and one of the second portions that is located on one side of and adjacent to the one of first portions, and a plurality of second turning portions each of which connects one of the first portions and one of the second portions that is located on the other side of and adjacent to the one of first portions. The winding step includes next steps: a step of setting prescribed dimensions L and p; a first wire feeding step of feeding the wire to thereby set the length L for one of the first portions based on the prescribed length L; a first turning step of turning, after the first wire feeding step, the wire on a turning base surface to thereby form one of the first turning portions and one of the first straight portions. The winding step also includes next steps: a first pushing step of pushing, after the first turning step, the one of first portions so that the one of first portion goes away from the turning base surface by the prescribed dimension p; a second wire feeding step of feeding, after the first pushing step, the wire to thereby set the length L for one of the second portions based on the prescribed length L; a second turning step of turning, after the second wire feeding step, the wire on the turning base surface in the same direction as the wire was turned in forming the one of first turning portions, to thereby form one of the second turning portions and form one of the second portions between the one of first turning portions and the one of second turning portions; and a second pushing step of pushing, after the second turning step, the one of second portions so that the one of second portions goes away from the turning base surface by the prescribed dimension p.

According to this manufacturing method of the coil assembly of the rotary electric machine, the prescribed dimensions L and p can be changed easily and hence a coil assembly can be manufactured while the length and the pitch of first and second portions of each coil member are changed when necessary.

The invention further provides a manufacturing apparatus for a coil member of a rotary electric machine having first turning portions, straight portions, and second turning portions. The manufacturing apparatus includes a rotary plate, a first motor, a central shaft, a shaping roller, a wire feed mechanism, a second motor, a first setting element, a pushing member, a third motor and a second setting member. The rotary plate has a turning base surface on which winding of a wire is performed. The first motor rotates the rotary plate intermittently about an axis thereof. The central shaft is provided perpendicularly to the turning base surface on the axis of the rotary plate. The shaping roller is attached to the rotary plate perpendicularly to the turning base surface and the shaping roller is opposed to the central shaft with a shaping gap formed in between, and rotates around the central shaft. The wire feed mechanism feeds the wire through the shaping gap. The second motor drives the wire feed mechanism intermittently. The first setting element sets a dimension L of the wire feed by the driving of the second motor. The pushing member is movable along the axis of the rotary plate. The third motor drives the pushing member intermittently. The second setting element sets a dimension p of a push of the pushing member by the driving of the third motor. The manufacturing apparatus executes next steps. One of the steps is causing the first motor to turn the wire on the turning base surface to thereby form one of the first turning portions. Another one of the steps is causing, after forming the one of first turning portions, the second motor to advance the wire by the dimension L that is set by the first setting element. Another one of the steps is causing, after advancing the wire, the first motor to turn the wire on the turning base surface in the same direction as the wire was turned in forming the one of first turning portions, to thereby form one of the second turning portions and form one of the straight portions between the one of first turning portions and the one of second turning portions. Still another one of the steps causing, after forming the one of second turning portions, the third motor to move the pushing member so as to push the one of straight portions so that the one of straight portion goes away from the turning base surface by the dimension p.

According to this manufacturing apparatus for the coil member of the rotary electric machine, the prescribed dimensions L and p can be changed easily and hence a coil member can be manufactured while the length and the pitch of straight portions of the coil member are changed easily when necessary.

BRIEF DESCRIPTION OF THE DRAWINGS

FIGS. 5(a) and 5(b) to FIGS. 22(a) and 22(b) illustrate respective steps of a winding step of a first embodiment relating to a manufacturing method of a coil member of a rotary electric machine according to the invention in which FIGS. 5(a), 6(a), . . . , 22(a) are plan views and FIGS. 5(b), 6(b), . . . , 22(b) are front views;

FIGS. 25(a) and 25(b) to FIGS. 30(a) and 30(b) illustrate respective steps of a weaving step of a second embodiment relating to a manufacturing method of a coil assembly of a rotary electric machine according to the invention in which FIGS. 25(a), 26(a), . . . , 30(a) are plan views and FIGS. 25(b), 26(b), . . . , 30(b) are front views;

DESCRIPTION OF THE PREFERRED EMBODIMENTS

Coil Member and Coil Assembly of Rotary Electric Machine

A coil member and a coil assembly of a rotary electric machine that are manufactured according to the present invention will be described before description of embodiments of manufacturing methods of a coil member and a coil assembly of a rotary electric machine and a manufacturing apparatus of a coil member of a rotary electric machine according to the invention.

Figure 1:
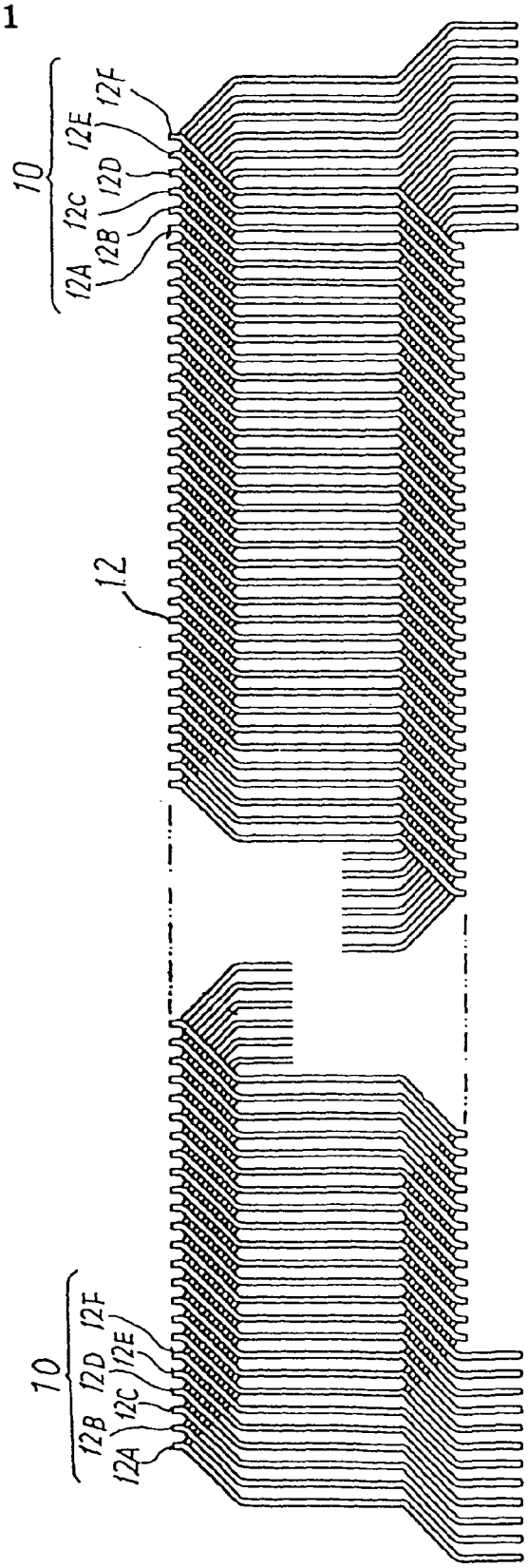
FIG. 1 is a development of a coil assembly of a rotary electric machine that is manufactured according to the present invention.
Figure 2:
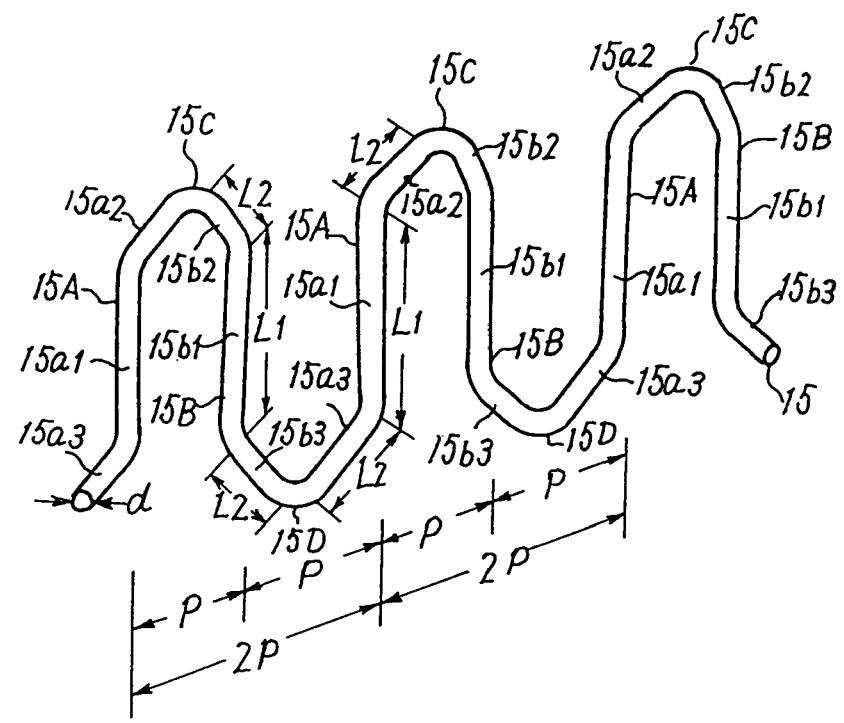
FIG. 2 is a development of part of a coil member of a rotary electric machine that is manufactured according to the present invention.
Figure 3:
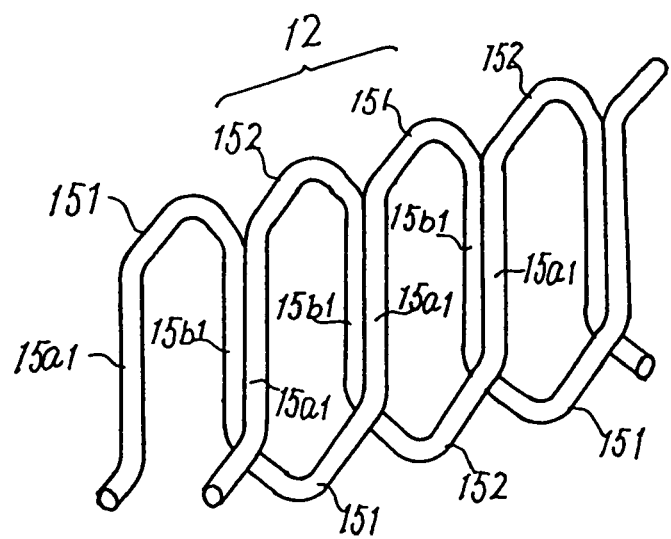
FIG. 3 is a development of part of one coil combination of a rotary electric machine that is manufactured according to the present invention.

FIG. 1 is a development of a coil assembly of a rotary electric machine that is manufactured by the manufacturing method of coil assembly of a rotary electric machine according to the invention. FIG. 2 is a perspective view of part of one coil member of the coil assembly shown in FIG. 1. FIG. 3 is a perspective view of part of one coil combination of the coil assembly shown in FIG. 1.

The coil assembly 10 of FIG. 1 has a plurality of coil combinations 12, specifically, six coil combinations 12A-12F. Each of the coil combinations 12A-12F extends in spiral form continuously from the left end to the right end in FIG. 1. Each coil combination 12 is a combination of a plurality of coil members 15, specifically, two coil members 151 and 152. As shown in FIG. 2, each coil member 15 is formed by winding a single insulated wire in spiral form. The coil assembly 10 of FIG. 1 has twelve coil members 15 in total because the coil assembly 10 has the six coil combinations 12 and each coil combination 12 has the two coil members 15. The wire of the coil members 15 is a long member in which a conductive material such as copper is coated with an insulative material; for example, a conductive material having a circular cross-section is coated with an enamel coating. Alternatively, a coated wire having a rectangular cross-section may be used.

In the developed state shown in FIG. 2, each coil member 15 has a plurality of portions 15A that are located in a first plane, a plurality of second portions 15B that are located in a second plane, a plurality of first turning portions 15C, and a plurality of second turning portions 15D. Each coil member 15 is formed by winding a single wire so as to form the portions 15A-15D that are continuous with each other. The first plane where the plurality of first portions 15A exist and the second plane where the plurality of second portions 15B exist are parallel with and opposed to each other with a very small gap interposed in between. Each of the first portions 15A has a first parallel straight portion 15a1 (the first parallel straight portions 15a1 are parallel with each other) and two inclined portions 15a2 and 15a3 that are inclined from the first parallel straight portion 15a1. The inclined portions 15a2 and 15a3 are located above and below the first parallel straight portion 15a1, respectively, in FIG. 2. Let L1 and L2 represent the lengths of the first parallel straight portion 15a1 and each of the two inclined portions 15a2 and 15a3; then, the length L of the first portion 15A is given by L=L1 and 2L2.

Each of the second folded straight portions 15B has a second parallel straight portion 15b1 (the second parallel straight portions 15b1 are parallel with each other) and two inclined portions 15b2 and 15b3 that are inclined from the second parallel straight portion 15b1. The inclined portions 15b2 and 15b3 are located above and below the second parallel straight portion 15b1, respectively, in FIG. 2. The length of the second parallel straight portion 15b1 is the same as that of the first parallel straight portion 15a1, that is, L1. The length of each of the inclined portions 15b2 add 15b3 is the same as that of each of the inclined portions 15a2 add 15a3, that is, L2. Therefore, the length of the second portion 15B is equal to the length L of the first portion 15A.

The interval between two adjoining first parallel straight portions 15a1 is equal to that between two adjoining second parallel straight portions 15b1 (represented by 2P in FIG. 2). Each second parallel straight portion 15b1 is parallel with each first parallel straight portion 15a1 and is located right at the center of the interval between the two parallel straight portions 15b1 adjacent to the second parallel straight portion 15a1. As a result, the interval between a first parallel straight portion 15a1 and a second parallel straight portion 15b1 adjacent to each other is equal to P.

In FIG. 2, the first turning portions 15C are located above the first portions 15A and the second portions 15B, and the second turning portions 15D are located below the first portions 15A and the second portions 15B. Each first turning portion 15C connects a first portion 15A (in the first plane) and a second portion 15B (in the second plane) that is located on one side of and adjacent to that first portion 15A. More specifically, each first turning portion 15C connects an inclined portion 15a2 (in the first plane) that is inclined from a first parallel straight portion 15a1 and an inclined portion 15b2 (in the second plane) that is inclined from a second parallel straight portion 15b1 that is located on one side of and adjacent to that first parallel straight portion 15a1.

Each second turning portion 15D connects a first portion 15A (in the first plane) and a second portion 15B (in the second plane) that is located on the other side of and adjacent to that first portion 15A. More specifically, each second turning portion 15D connects an inclined portion 15a3 (in the first plane) that is inclined from a first parallel straight portion 15a1 and an inclined portion 15b3 (in the second plane) that is inclined from a second parallel straight portion 15b1 that is located on the other side of and adjacent to that first parallel straight portion 15a1.

Each coil combination 12, that is, each of the coil combinations 12A-12F that constitute the coil assembly 10 shown in FIG. 1, is configured as shown in FIG. 3. Naturally, FIG. 3 also shows a developed state. Each coil combination 12 is a combination of two coil members 151 and 152. In the coil combination 12 that is shown in FIG. 3 in a developed state, the second parallel straight portions 15b1 of the coil member 152 contact, from below, the respective first parallel straight portions 15a1 of the coil member 151, and the first parallel straight portions 15a1 of the coil member 152 contact, from above, the respective second parallel straight portions 15b1 of the coil member 151.

The coil assembly 10 of FIG. 1 is placed in a plurality of slots of the inner circumferential surface of a cylindrical stator iron core at prescribed intervals. The coil assembly 10 also assumes a cylindrical shape as a whole in a state that it is attached to the stator iron core; FIG. 1 shows the coil assembly 10 as developed on a plane. In a state that the coil member 10 is attached to the stator iron core, a first parallel straight portion 15a1 of the coil member 151 is inserted in a slot and a second parallel straight portion 15b1 of the coil member 152 is inserted in the same slot so as to contact that first parallel straight portion 15a1 from below. A second parallel straight portion 15b1 of the coil member 151 is inserted in another slot that is distant from the former slot by the pitch P and a first parallel straight portion 15a1 and a first parallel straight portion 15a1 of the coil member 152 is inserted in the same slot so as to contact that second parallel straight portion 15b1 from above.

Embodiment Relating to Manufacturing Method of Coil Member 15 of Rotary Electric Machine Embodiment 1

A first embodiment relating to the manufacturing method of a coil member 15 of a rotary electric machine according to the invention will be hereinafter described.

In the manufacturing method of a coil assembly 10 according to the invention, a winding step of forming coil members 15, a weaving step, a pressing step, a displacing step, and an inserting step are executed in this order. Since the weaving step and the following steps constitute a manufacturing method of a coil assembly 10 using coil members 15, firstly, the first embodiment relating to the manufacturing method of a coil member 15 according to the invention that is mainly the winding step of forming a coil member 15 will be described and then an embodiment relating to the manufacturing method of a coil assembly 10 using resulting coil members 15 will be described.

In the manufacturing method of the coil assembly 10, the first and second portions 15A, 15B are folded to have the parallel straight portions 15a1, 15b1 and inclined portions 15a2, 15a3 and 15b2, 15b3 shown in FIG. 3 by displacing at the displacing step. Before the displacing, the first and second portions 15A and 15B are not folded and the first and second portions 15A, 15b1 are straight portions including portions 15a1, 15b1 and portions 15a2, 15a3, 15b2, 15b3 that will be folded. Then the first portion 15A and the second portion 15B are so called as the straight first portion 15A and the straight second portion 15B before their displacing.

<Main Configuration of Winding Machine Used>

Figure 4:
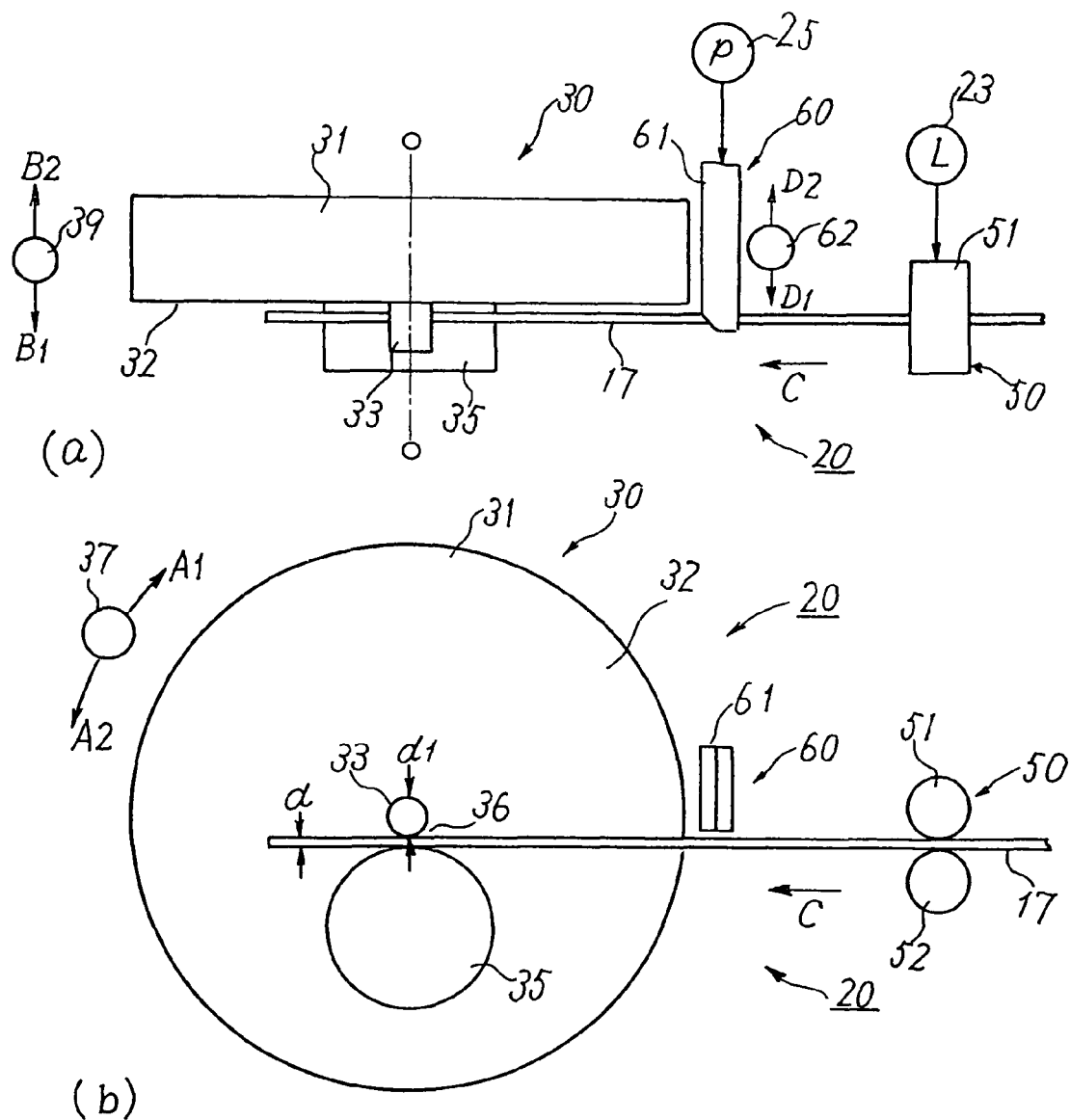
FIGS. 4(a) and 4(b) are a plan view and a front view, respectively, showing the main part of a coil manufacturing apparatus that is used in a manufacture method of a coil member of a rotary electric machine according to the invention.

FIGS. 4A(a) and 4(b) are a plan view and a front view, respectively, showing the main configuration of a winding machine 20 that is used in the first embodiment. As shown in FIGS. 4(a) and 4(b), the winding machine 20 has a turning mechanism 30, a wire feed mechanism 50, and a pushing mechanism 60 and winds a wire 17 in spiral form.

The turning mechanism 30 has a rotary plate 31, a central shaft 33, and a shaping roller 35. The turning mechanism 30 has a rotational driving mechanism 37 for driving the rotary plate 31 rotationally. The rotary plate 31 is rotated intermittently about its axis O-O in directions indicated by arrows A1 and A2. The rotary plate 31 is circular, for example, and its one major surface is a circular rotary surface 32, which serves as a turning base surface for shaping the wire 17 in spiral form. The central shaft 33 has the axis O-O as its axis. The central shaft 33 is directly attached to the rotary plate 31 or disposed so as to have the axis O-O as its axis when it is separate from the rotary plate 31. The central shaft 33 has a circular cross-section having a diameter d1.

The turning mechanism 30 has a rotary plate moving mechanism 39 that reciprocates the rotary plate 31 along its axis O-O. The rotary plate 31 is driven so as to reciprocate intermittently along its axis O-O in directions indicated by arrows B1 and B2.

The shaping roller 35 is placed on the turning base surface 32 and attached to the rotary plate 31, and hence rotates together with the rotary plate 31. The shaping roller 35 has a circular cross-section that is larger in diameter than the circular cross-section of the central shaft 33, and forms a shaping gap 36 with the central shaft 33. The dimension of the shaping gap 36 in the radial direction of the rotary shaft 31 is equal to the diameter d of the wire 17 plus a small margin. The margin is so set as to enable smooth insertion of the wire 17 into the shaping gap 36.

The wire feed mechanism 50 has a pair of feed rollers 51 and 52, at least one of which is an elastic roller. The feed rollers 51 and 52 feed the wire 17 intermittently in a direction indicated by arrow C toward the shaping gap 36 while holding the wire 17 elastically in between.

The pushing mechanism 60 has a pushing member 61 and a reciprocative driving mechanism 62 therefor. The reciprocative driving mechanism 62, which is to push the wire 17 along the axis so O-O of the rotary plate 31 so as to go away from the turning base surface 32 for forming straight first portions 15A and straight second portions 15B of a coil member 15 that is wound in spiral form, drives the pushing member 61 so that it is reciprocated intermittently along the axis O-O of the rotary plate 31 in directions indicated by arrows D1 and D2. The pushing member 61 is disposed very close to the rotary plate 31 immediately over that part of the wire 17 which extends between the shaping gap 36 and the wire feed mechanism 50.

The winding machine 20 of FIGS. 4(a) and 4(b) further has setting elements 23 and 25 for setting prescribed dimensions L and p. The first setting element 23 is to set, in the wire feed mechanism 50 that is driven intermittently, a feed length L of the wire 17 at the time of each feed. The setting element 25 is to set, for the pushing member 61, its push length p. The wire feed length L is equal to the length of each of the straight first portion 15A and the straight second portion 15B of the coil member 15 shown in FIG. 2, that is, the sum of the length L1 of each of the first parallel straight portion 15a1 and the second parallel straight portion 15b1 and two times the length L2 of each of the inclined portions 15a2, 15a3, 15b2, and 15b3. The push length p determines the pitch P between the first parallel straight portion 15a1 and the second parallel straight portion 15b1, and is set equal to 2P, for example.

<Winding Step>

Figure 24:
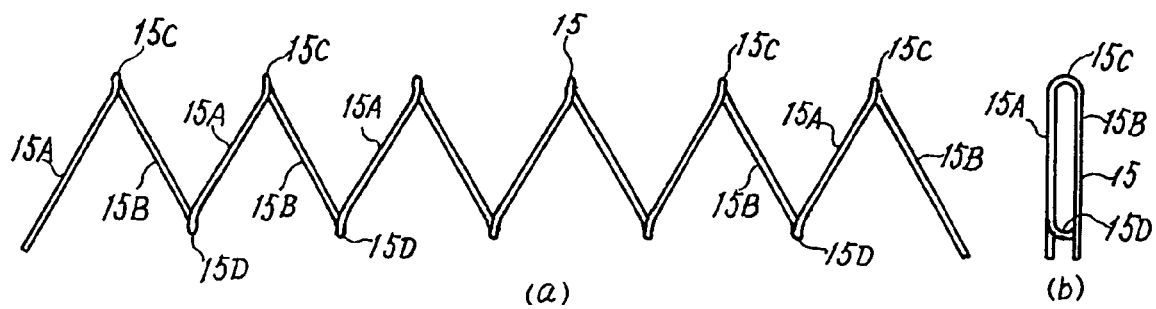
FIGS. 24(a) and 24(b) are a plan view and a front view, respectively, of a coil member obtained after completion of execution of the winding step of the first embodiment.
Figure 31:
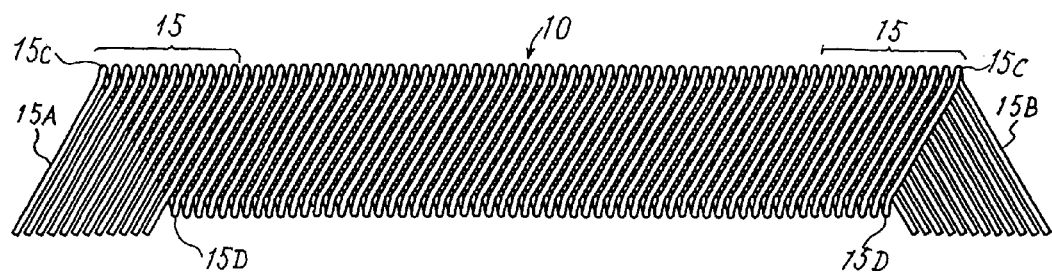
FIG. 31 is a plan view of a coil assembly that is obtained after completion of execution of the weaving step of the second embodiment.

FIGS. 5(a) and 5(b) to FIGS. 22(a) and 22(b) show, in order, steps of the winding step of forming a coil member 15 according to the invention. The winding step of forming a coil member 15 will be described below in detail with reference to those drawings. FIGS. 5(a), 6(a), ..., 22(a) are plan views and FIGS. 5(b), 6(b), ..., 22(b) are front views. In this winding step, a coil member 15 as shown in FIG. 24 is manufactured. FIG. 31 shows a coil assembly obtained after completion of execution of a weaving step on a plurality of coil members 15. The coil assembly shown in FIG. 31 as subjected to the weaving is then subjected to a pressing step and a displacing step, whereby a coil assembly 10 as shown in FIG. 1 is formed, which is inserted into the slots of an iron core.

(1) First Step (Wire Feeding step; FIGS. 5(a) and 5(b) and FIGS. 6(a) and 6(b))

In a first step that is a first wire feeding step, a portion having the length L is set for a straight first portion 15A. In this step, the rotary plate 31 and the pushing member 61 of the winding machine 20 stand still. In this state, the wire feed mechanism 50 is driven, whereby the wire 17 is supplied to the shaping gap 36 as indicated by arrow C. The contact point of the feed rollers 51 and 52 and the shaping gap 36 lie in plane E-E. It is assumed that the wire 17 is supplied horizontally from the feed mechanism 50 toward the shaping gap 36 so as to trace a wire supply line that lies in plane E-E. FIGS. 6(a) and 6(b) show a state that the tip of the wire 17 has advanced leftward by the length L from the shaping gap 36, whereby a portion having the length L is set for the straight first portion 15A. The feed of the wire 17 by the feed mechanism 50 is suspended once the state of FIGS. 6(a) and 6(b) is reached. FIGS. 5(a) and 5(b) show a halfway state before the state of FIGS. 6(b) and 6(b). In this first step, the shaping roller 35 is located right under the central shaft 33 and the center axis of the shaping roller 35 is located right under the axis O-O (in the vertical direction).

(2) Second Step (Turning Step; FIGS. 7(a) and 7(b) and FIGS. 8(a) and 8(b))

Figure 7:
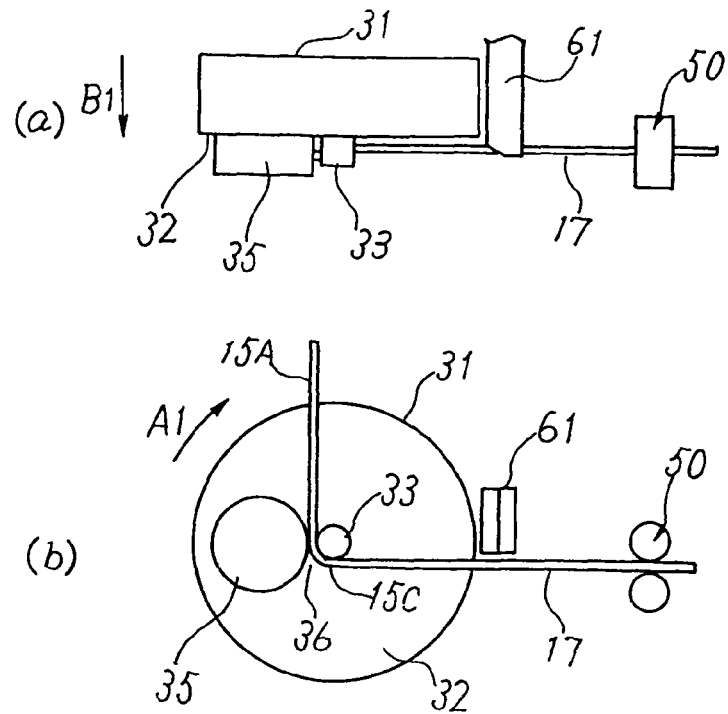

A second step is a turning step of bending the wire 17, that is, a step of forming one straight first portion 15A and one first turning portion 15C in the wire 17. In this step, the rotation of the wire feed mechanism 50 is suspended and the wire 17 is gripped by the feed rollers 51 and 52 being sandwiched between them. The rotary plate 31 is rotated in a direction indicated by arrow A1. As a result, as the shaping roller 36 rotates, that portion of the wire 17 which projects from the shaping gap 36 is bent along the outer circumferential surface of the central shaft 33 on the turning surface 32. FIGS. 7(*a*) and 7(*b*) show a state that the rotary plate 31 has been rotated by 90° from the position of FIGS. 6(*a*) and 6(*b*) and approximately a half of one turning portion 15C has been formed around the central shaft 33.

Between the state of FIGS. 6(*a*) and 6(*b*) and the state of FIGS. 7(*a*) and 7(*b*), the rotary plate 31 is moved along its axis O-O in a direction indicated by arrow B1, whereby the angle of the turning portion 15C is adjusted.

In the second step, the pushing member 60 still stands still.

Figure 8:
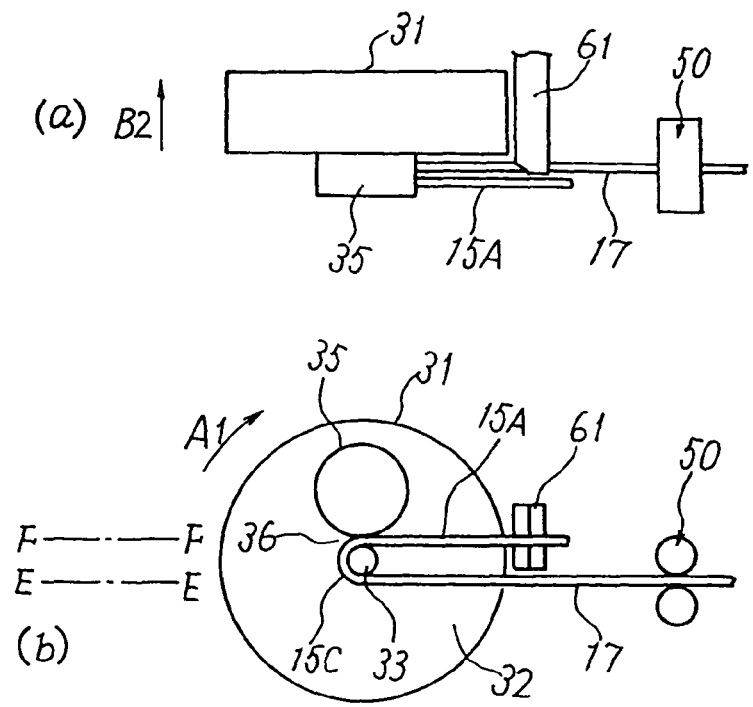

In the second step, between the state of FIGS. 7(*a*) and 7(*b*) and a state of FIGS. 8(*a*) and 8(*b*), the rotary plate 31 is further rotated by 90° in the direction indicated by arrow A1. In the state of FIGS. 8(*a*) and 8(*b*), the rotary plate 31 has been rotated by 180° from the state of FIGS. 6(*a*) and 6(*b*); the shaping roller 35 is located right over the central shaft 33, that portion of the wire 17 which projects from the shaping gap 36 extends horizontally in plane F-F, and the tip of the wire 17 is directed rightward. Plane F-F is parallel with plane E-E and is higher than plane E-E by a dimension that is equal to the diameter d1 of the central shaft 33. One complete turning portion 15C is formed as a result of the 180°-turn of the wire 17. The inner diameter of the turning portion 15C is approximately equal to the diameter d1 of the central shaft 33. One straight first portion 15A is formed between the tip of the wire 17 and the turning portion 15C. The straight first portion 15A and the turning portion 15C correspond to the left end portion of the coil member 15 of FIG. 2. However, since the wire 17 has not been subjected to the displacing step yet, a first parallel straight portion 15*a*1 and inclined portions 15*a*2 and 15*a*3 have not been formed yet and hence the straight first portion 15A is still straight. The rotation of the rotary plate 31 is suspended once the state of FIGS. 8(*a*) and 8(*b*) is reached. Between the state of FIGS. 7(*a*) and 7(*b*) and the state of FIGS. 8(*a*) and 8(*b*), the rotary plate 31 is returned along its axis O-O in a direction indicated by arrow B2 that is opposite to the direction indicated by arrow B1.

In the second step, a half turn of the intended coil member 15 is formed that includes the straight first portion 15A that exists in plane F-F and the first turning portion 15C.

Figure 9:
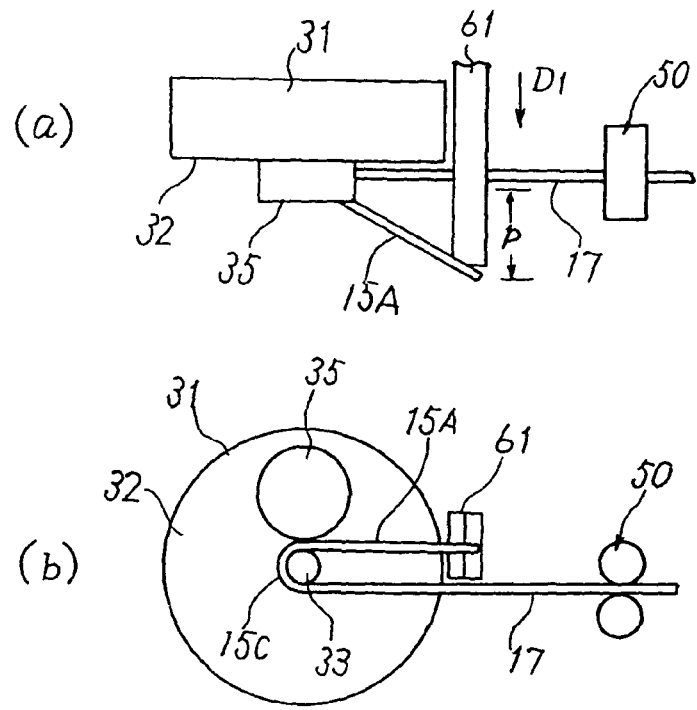

(3) Third Step (Pushing Step; FIGS. 9(*a*) and 9(*b*) and FIGS. 10(*a*) and 10(*b*))

A third step is a step of pushing the straight first portion 15A. In this pushing step, after the half turn has been formed in the second step, the pushing member 61 is moved along the axis O-O in a direction indicated by arrow D1, whereby the one straight first portion 15A is pushed in plane F-F so as to go away from the turning base surface 32. FIGS. 9(*a*) and 9(*b*) show a state that the rotary plate 31 stands still, the feed of the wire 17 by the feed mechanism 50 is suspended, and the wire 17 is gripped by the feed rollers 51 and 52 being sandwiched in between. In this state, the pushing member 61 is moved along the axis O-O in the direction indicated by arrow D1, whereby the one straight first portion 15A is pushed by the prescribed dimension p so as to go away from the turning base surface 32. Between the state of FIGS. 9(*a*) and 9(*b*) and a state of FIGS. 10(*a*) and 10(*b*), the pushing member 61 is returned to the original position in a direction indicated by arrow D2 that is opposite to the direction indicated by arrow D1. Further, between the state of FIGS. 9(*a*) and 9(*b*) and the state of FIGS. 10(*a*) and 10(*b*), the rotary plate 31 is rotated in a direction indicated by arrow A2 that is opposite to the direction indicated by arrow A1 so that the shaping roller 35 returns to the position right under the central shaft 33.

Figure 11:
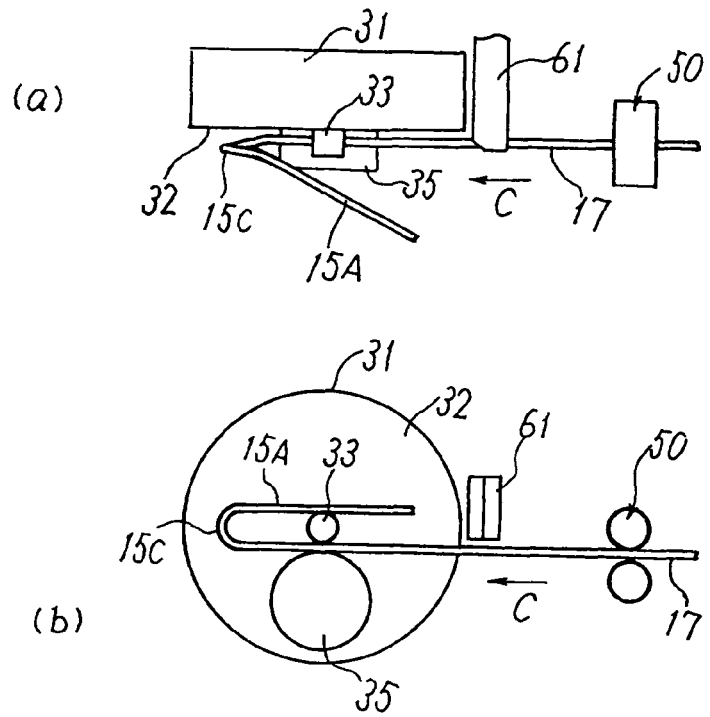

(4) Fourth Step (Wire Feeding Step; FIGS. 11(*a*) and 11(*b*) and FIGS. 12(*a*) and 12(*b*))

Figure 12:
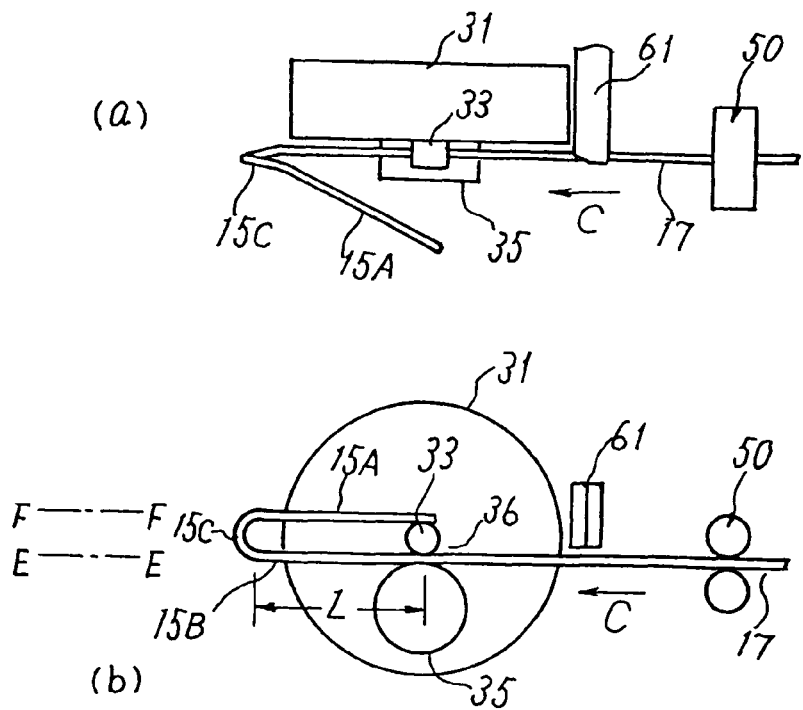

A fourth step is a second wire feeding step which is the same wire feeding step as the first step is. The individual components of the winding machine 20 shown in FIGS. 4(*a*) and 4(*b*) are moved in the same manner as in the first step. In the fourth step, a portion having the prescribed length L is set for a straight second portion 15B in plane E-E between the one turning portion 15C and the next turning portion 15D. In the fourth step, the rotary plate 31 and the pushing member 61 stand still and the wire 17 is fed by the wire feed mechanism 50. FIGS. 11(*a*) and 11(*b*) show a halfway state of an operation that the wire 17 is fed in the direction indicated by arrow C in plane E-E. Then, the wire 17 is further fed by the wire feed mechanism 50 until a state of FIGS. 12(*a*) and 12(*b*) is reached so as to be fed by the length L from the state of FIGS. 10(*a*) and 10(*b*). In the state of FIGS. 12(*a*) and 12(*b*), in plane E-E, a portion having the length L is set between the turning portion 15C of the wire 17 and the shaping gap 36. Once the state of FIGS. 12(*a*) and 12(*b*) is reached, the feed of the wire 17 by the wire feed mechanism 50 is suspended.

Figure 13:
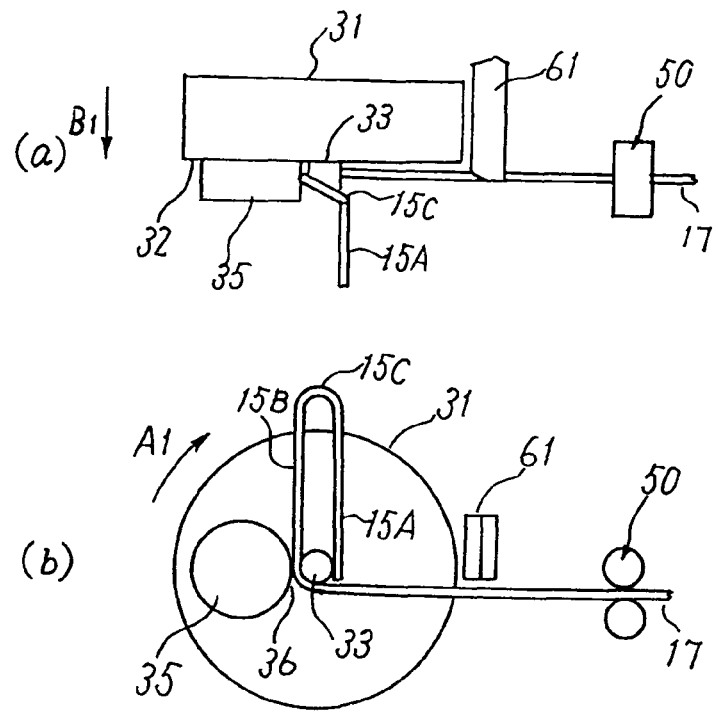

(5) Fifth Step (Turning Step; FIGS. 13(*a*) and 13(*b*) and FIGS. 14(*a*) and 14(*b*))

Figure 14:
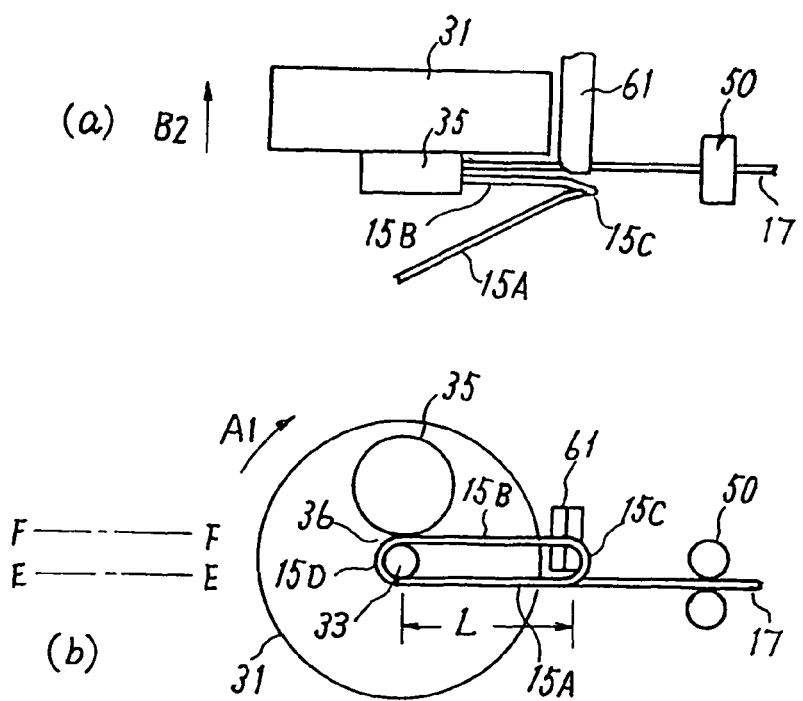

In a fifth step that is a turning step, the individual components of the winding machine 20 are moved in the same manner as in the second step, whereby the next turning portion 15D is formed. In the fifth step, the feed of the wire 17 by the wire feed mechanism 50 is suspended and, instead, the rotary plate 31 is rotated again in the direction indicated by arrow A1. FIGS. 13(*a*) and 13(*b*) show a state that the rotary plate 31 has been rotated in the direction indicated by arrow A1 by 90° from the state of FIGS. 12(*a*) and 12(*b*), and FIGS. 14(*a*) and 14(*b*) show a state that the rotary plate 31 has been rotated further in the direction indicated by arrow A1 by 90° from the state of FIGS. 13(*a*) and 13(*b*). The rotary plate 31 is rotated together with the shaping roller 35 in the state that that portion of the wire 17 which has projected by the length L from the shaping gap 36 in the fourth step is sandwiched between the central shaft 33 and the shaping roller 35, whereby the next turning portion 15D is formed at a position that is distant from the turning portion 15C by the length L. In the state of FIGS. 14(*a*) and 14(*b*), the first portion 15A is located in plane E-E and one straight second portion 15B is formed between the turning portions 15C and 15D in plane F-F. The inner diameter of the turning portion 15D is approximately equal to the diameter d1 of the central shaft 33.

As a result of the execution of the above fourth and fifth steps, the next half turn of the intended coil member 15 including the straight second portion 15B and the second turning portion 15D is formed. As a result of the execution of the above first to fifth steps, one turn of the intended coil member 15 including the straight first portion 15A, the turning portion 15C, the straight second portion 15B, and the turning portion 15D is formed in the wire 17.

Figure 15:
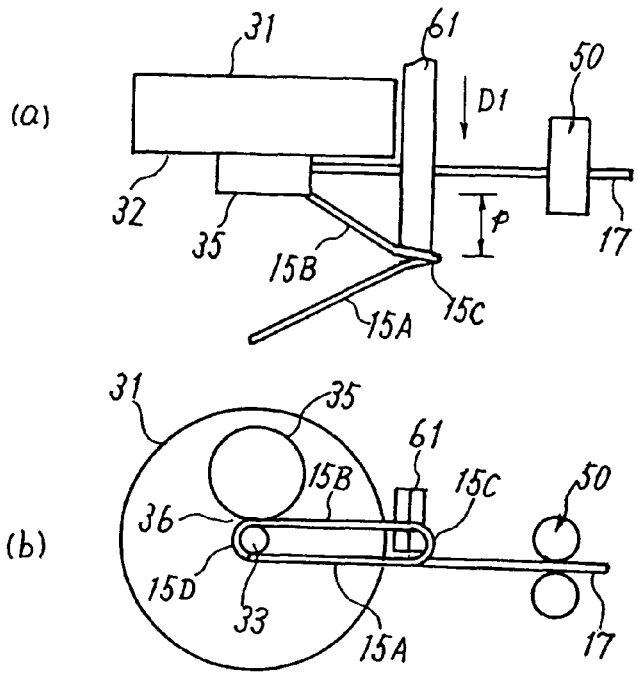

(6) Sixth Step (Pushing Step; FIGS. 15(*a*) and 15(*b*) and FIGS. 16(*a*) and 16(*b*))

A sixth step is a pressing step. The individual components of the winding machine 20 are moved in the same manner as in the third step shown in FIGS. 9(*a*) and 9(*b*) and FIGS. 10(*a*) and 10(*b*). In the sixth step, after the next half turn of the intended coil member 15 has been formed in the fifth step, the pushing member 61 is moved again in the direction indicated by arrow D1, whereby the one second portion 15B that has been formed in the fifth step is pushed in plane F-F by the prescribed dimension p so as to go away from the turning base surface 32. The pushing member 61 is moved in the direction indicated by arrow D1 between the state of FIGS. 14(*a*) and 14(*b*) and the state of FIGS. 15(*a*) and 15(*b*), and is then moved in the direction indicated by arrow D2 that is opposite to the direction indicated by arrow D1 and thereby returned to the original position between the state of FIGS. 15(*a*) and 15(*b*) and the state of FIGS. 16(*a*) and 16(*b*). In the sixth step, the feed of the wire 17 by the feed mechanism 50 is suspended. On the other hand, the rotation of the rotary plate 31 is suspended between the state of FIGS. 14(*a*) and 14(*b*) and the state of FIGS. 15(*a*) and 15(*b*) and is returned in the direction indicated by arrow A2 that is opposite to the direction indicated by arrow A1 between the state of FIGS. 15(*a*) and 15(*b*) and the state of FIGS. 16(*a*) and 16(*b*).

Figure 17:
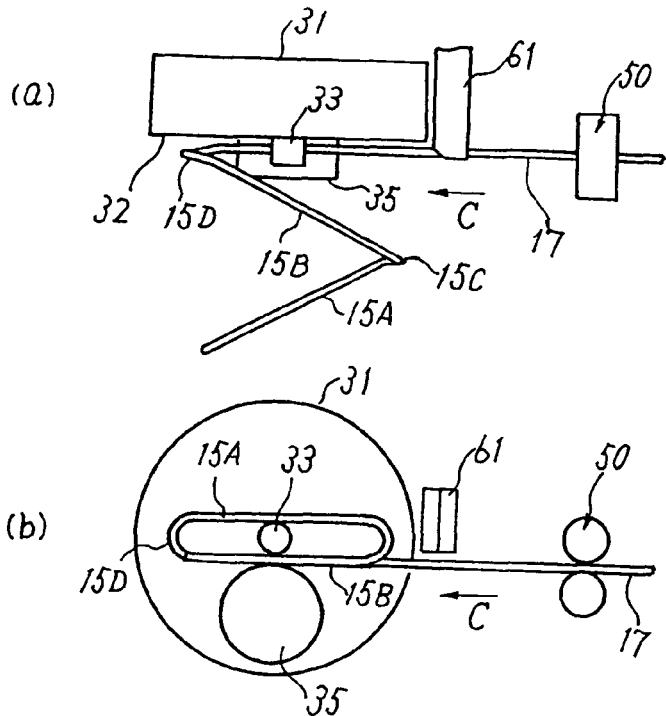

(7) Seventh Step (Wire Feeding Step; FIGS. 17(*a*) and 17(*b*) and FIGS. 18(*a*) and 18(*b*))

Figure 18:
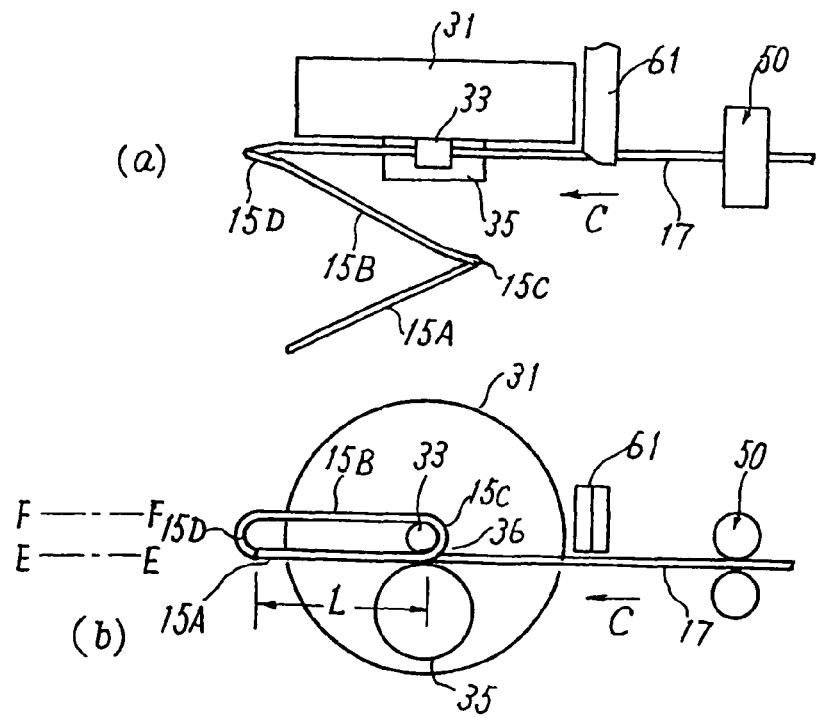

In a seventh step that is a wire feeding step, the individual components of the winding machine 20 are moved in the same manner as in the first step shown in FIGS. 5(*a*) and 5(*b*) and FIGS. 6(*a*) and 6(*b*) and the fourth step shown in FIGS. 11(*a*) and 11(*b*) and FIGS. 12(*a*) and 12(*b*). While the rotation of the rotary plate 31 continues to be suspended (the state of FIGS. 16(*a*) and 16(*b*) is kept), the wire 17 is fed by the feed mechanism 50 in the direction indicated by arrow C so as to trace the supply line. FIGS. 17(*a*) and 17(*b*) show a state that the wire 17 has been fed leftward by a length L/2 from the state of FIGS. 16(*a*) and 16(*b*) so as to trace the supply line, and FIGS. 18(*a*) and 18(*b*) show a state that the wire 17 has been fed by a length L from the state of FIGS. 16(*a*) and 16(*b*) so as to trace the supply line. FIGS. 18(*a*) and 18(*b*) show a state that the turning portion 15D has been advanced leftward by the length L from the state of FIGS. 16(*a*) and 16(*b*) and a portion having the length L is set between the turning portion 15D and the shaping gap 36 in plane E-E.

Figure 19:
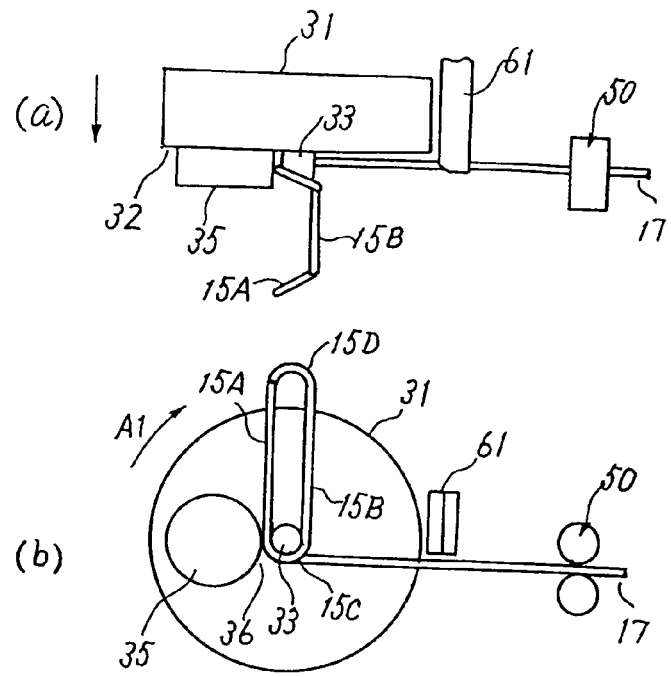

(8) Eighth step (Turning Step; FIGS. 19(*a*) and 19(*b*) and FIGS. 20(*a*) and 20(*b*))

In an eighth step that is a turning step, the individual components of the winding machine 20 are moved in the same manner as in the second step shown in FIGS. 7(*a*) and 7(*b*) and FIGS. 8(*a*) and 8(*b*) and the fifth step shown in FIGS. 13(*a*) and 13(*b*) and FIGS. 14(*a*) and 14(*b*). The operation of the wire feed mechanism 50 is suspended. The rotary plate 31 is rotated again in the direction indicated by arrow A1 while the wire 17 is gripped by the rollers 51 and 52 being sandwiched between them. FIGS. 19(*a*) and 19(*b*) show a state that the shaping roller 35 has been rotated by 90° from the state of FIGS. 18A and 18B, and FIGS. 20A and 20B show a state the shaping roller 35 has been rotated by 180° from the state of FIGS. 18(*a*) and 18(*b*) to form the next turning portion 15C. In the eighth step, the next half turn of the intended coil member 15 including a straight first portion 15A and a first turning portion 15C is formed.

Figure 21:
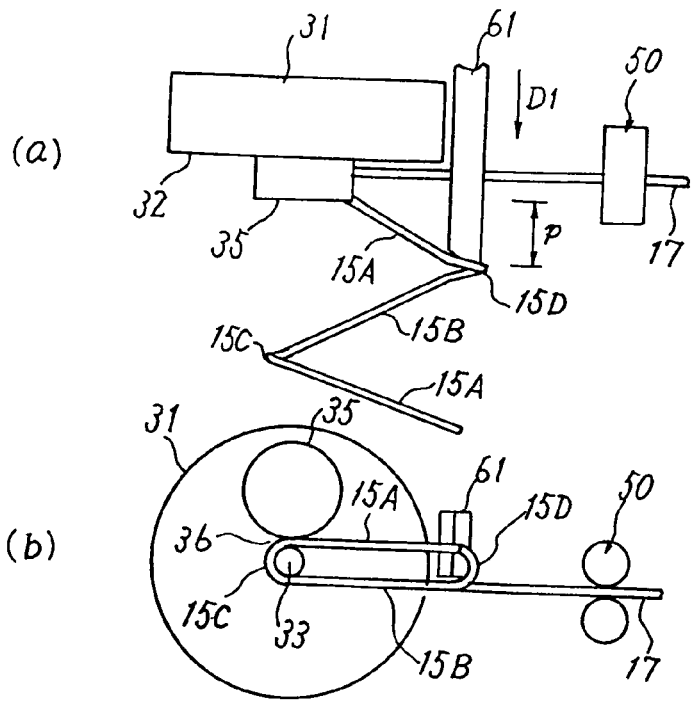

(9) Ninth step (Pushing Step; FIGS. 21(*a*) and 21(*b*) and FIGS. 22(*a*) and 22(*b*))

Figure 10:
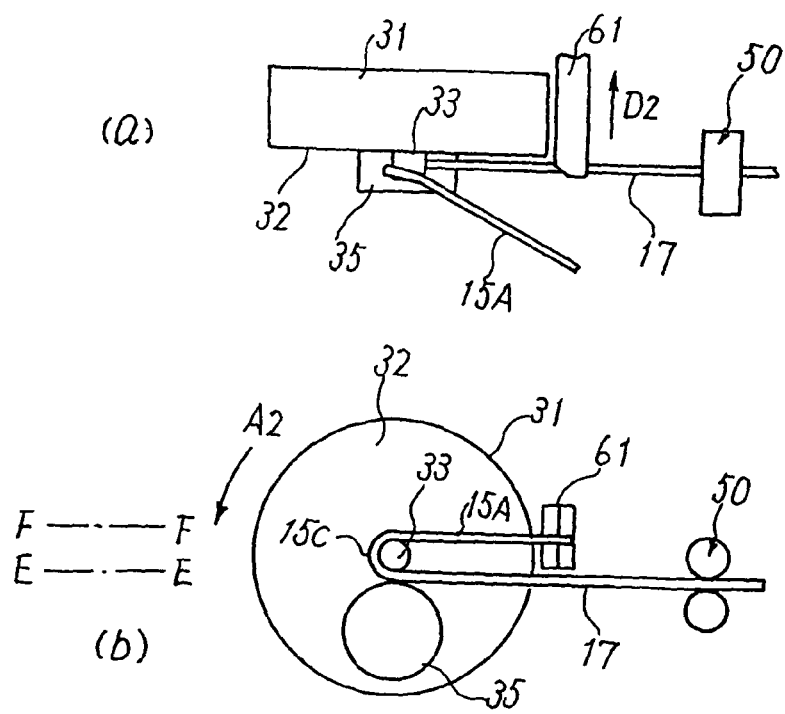
Figure 16:
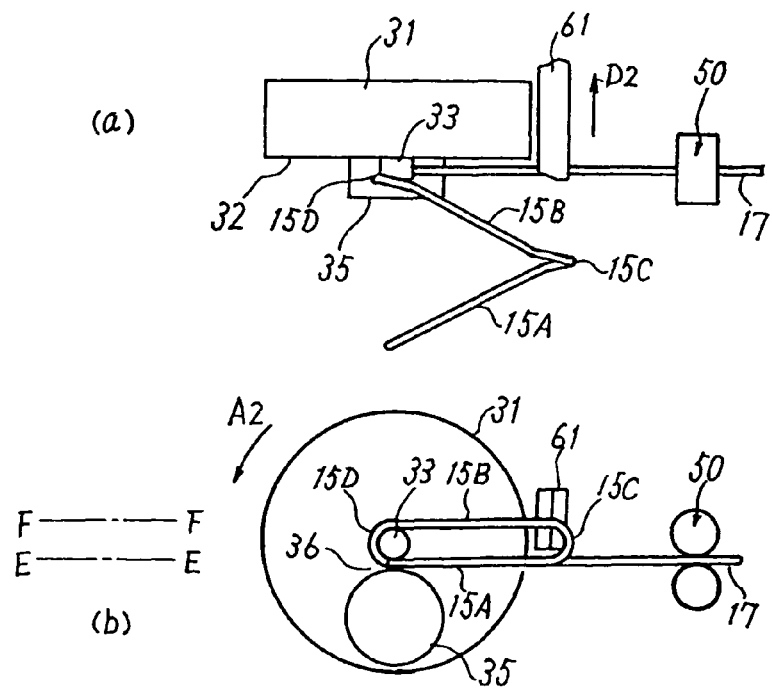

In a ninth step that is a pushing step, the individual components of the winding machine 20 are moved in the same manner as in the third step shown in FIGS. 9(*a*) and 9(*b*) and FIGS. 10(*a*) and 10(*b*) and the sixth step shown in FIGS. 15(*a*) and 15(*b*) and FIGS. 16(*a*) and 16(*b*). In a state that the wire 17 is kept gripped by the rollers 51 and 52 being sandwiched in between, as shown in FIGS. 21(*a*) and 21(*b*), the pushing member 61 is moved in the direction indicated by arrow D1, whereby the straight first portion 15A is pushed by the prescribed length p so as to go away from the turning base surface 32. In the state of FIGS. 21(*a*) and 21(*b*), the shaping roller 35 is held right over the central shaft 33 as in the state of FIGS. 20(*a*) and 20(*b*). On the other hand, between the state of FIGS. 21(*a*) and 21(*b*) and the state of FIGS. 22(*a*) and 22(*b*), the shaping roller 35 is moved (returned) in the direction indicated by arrow A2 until it is located right under the central shaft 33. Also between the state of FIGS. 21(*a*) and 21(*b*) and the state of FIGS. 22(*a*) and 22(*b*), the pushing member 61 is moved in the direction indicated by arrow D2 and thereby returned to the original position.

Figure 23:
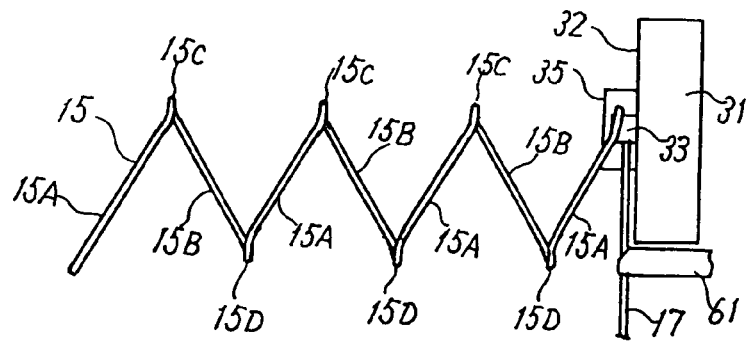
FIG. 23 is a plan view showing an intermediate state of the winding step of the first embodiment relating to the manufacturing method of a coil member of a rotary electric machine according to the invention.

The first to ninth steps of the winding step to form a coil member 15 have been described above in detail. It is understood from the above description that the first to third steps (three steps), the fourth to sixth steps (three steps), and the seventh to ninth steps (three steps) constitute respective winding step units. Each winding step unit includes the wire feeding step that is represented by the first, fourth, and seventh steps, the turning step that is represented by the second, fifth, and eighth steps, and the pushing step that is represented by the third, sixth, and ninth steps. The individual components of the winding machine 20 are moved in the same manner in each winding step unit, every time one winding step unit is executed, a half turn of the intended coil member 15 is formed and then pushed by the prescribed length p so as to go away from the turning base surface 32. Therefore, by repeatedly executing the winding step unit, half turns of the intended coil member 15 are formed sequentially. In this manner, a coil member 15 having a necessary number of turns is manufactured. FIG. 23 shows a state that 3.5 turns have been formed by executing the winding step unit seven times. FIGS. 24(*a*) and 24(*b*) are a plan view and a front view, respectively, of a coil member 15 obtained after completion of execution of the winding step.

According to the manufacturing method of the first embodiment, the length L of each of the straight first portion 15A and the straight second portion 15B of a coil member 15 is determined by the length L of the feed of the wire 17 by the wire feed mechanism 50 in the first step (FIGS. 5(*a*) and 5(*b*) and FIGS. 6(*a*) and 6(*b*)), the fourth step (FIGS. 11(*a*) and 11(*b*) and FIGS. 12(*a*) and 12(*b*)), and the seventh step (FIGS. 17(*a*) and 17(*b*) and FIGS. 18(*a*) and 18(*b*)) and hence can easily be changed by causing the setting element 23 to change the setting value of the length L. The pitch P between the first parallel straight portion 15*a*1 and the second parallel straight portion 15*b*1 of a coil member 15 is determined by the push length p of the pushing member 61 in the third step (FIGS. 9(*a*) and 9(*b*) and FIGS. 10(*a*) and 10(*b*)), the sixth step (FIGS. 15(*a*) and 15(*b*) and FIGS. 16(*a*) and 16(*b*)), and the ninth step (FIGS. 21(*a*) and 21(*b*) and FIGS. 22(*a*) and 22(*b*)) and hence can easily be changed by causing the setting element 25 to change the setting value of the length p. In particular, it is possible to change the pitch P partially in a single coil combination 12. Further, since the wire 17 is turned on the common turning base surface 32, turning portions can be made smaller than in the conventional method in which a pair of plate-like winding cores are rotated.

The first embodiment can correctly form turning portions that are uniform in shape because first turning portions 15C and second turning portions 15D are formed by using the turning mechanism 30. Since the turning mechanism 30 is provided with the central shaft 33 and the shaping roller 35 that is rotated around the central shaft 33, the wire 17 is bent smoothly to form each turning portion. Even if the wire 17 is an insulated wire, there does not occur trouble that the insulation coating peels off at turning portions. Since the wire 17 is bent through rotation of the shaping roller 35 at the shaping gap 36 between the central shaft 33 and the shaping roller 35, turning portions can easily be formed. Further, since the shaping roller 35 as well as the central shaft 33 is provided on the rotary plate 31, the turning mechanism 30 can be constructed more easily.

In the first embodiment, the wire 17 is bent by the turning mechanism 30 in a state that the wire 17 is gripped by the wire feed mechanism 50. The wire 17 is prevented from moving when it is bent, and hence the wire 17 can be bent correctly. The first embodiment employs the pushing member 61 that is movable in the axial direction of the rotary plate 31. The pushing member 61 can easily push a straight first portion 15A and a straight second portion 15B so that they go away from the turning base surface 32. Further, the first embodiment employs the rotary plate moving mechanism 39 to move the rotary plate 31 in its axial direction. This makes it possible to easily adjust the angle of turning portions by moving the rotary plate 31 in its axial direction.

Embodiments Relating to Manufacturing Method of Coil Assembly 10 of Rotary Electric Machine Embodiment 2

Next, a description will be made of a second embodiment relating to the manufacturing method of a coil assembly 10 of a rotary electric machine that has a plurality of coil members 15. In the second embodiment, a coil assembly 10 is manufactured by using coil members 15 manufactured according to the first embodiment. In this manufacturing method of a coil assembly 10, a weaving step, a pressing step, a displacing step, and an inserting step are executed in this order.

<Weaving Step>

Figure 25:
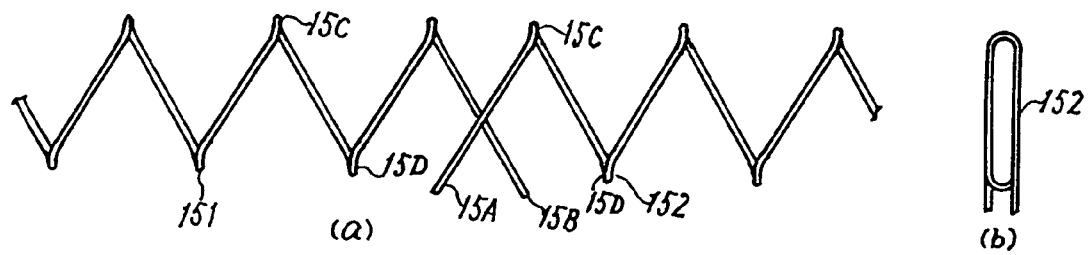
Figure 26:
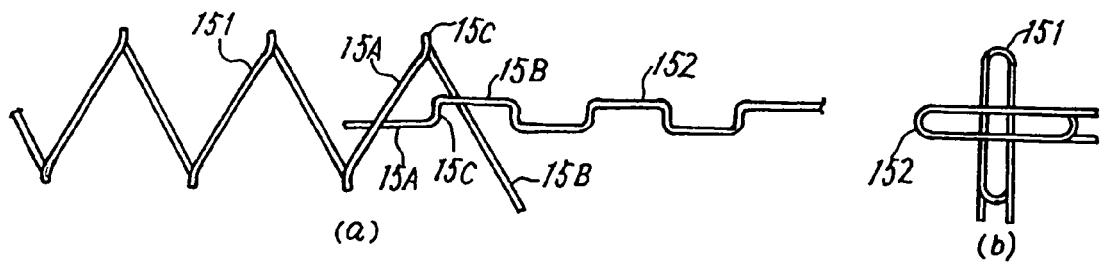
Figure 27:
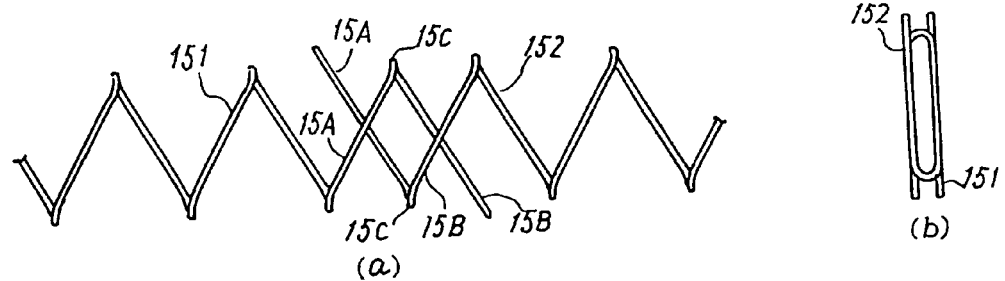
Figure 28:
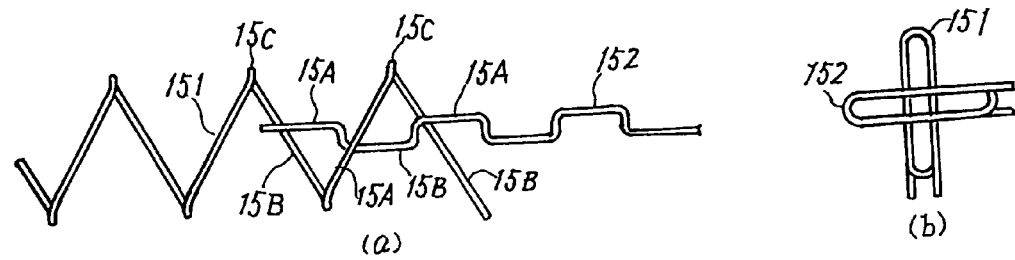
Figure 29:
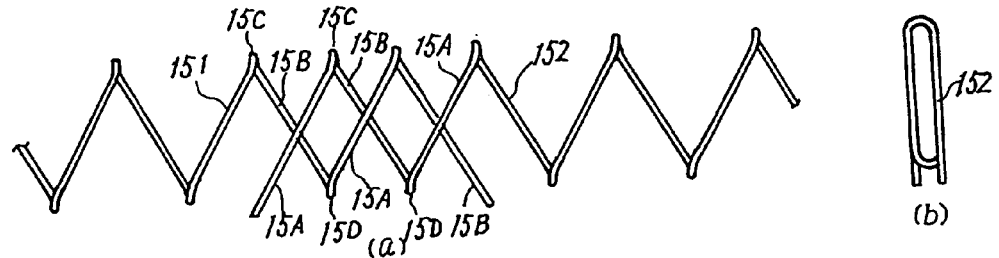
Figure 30:
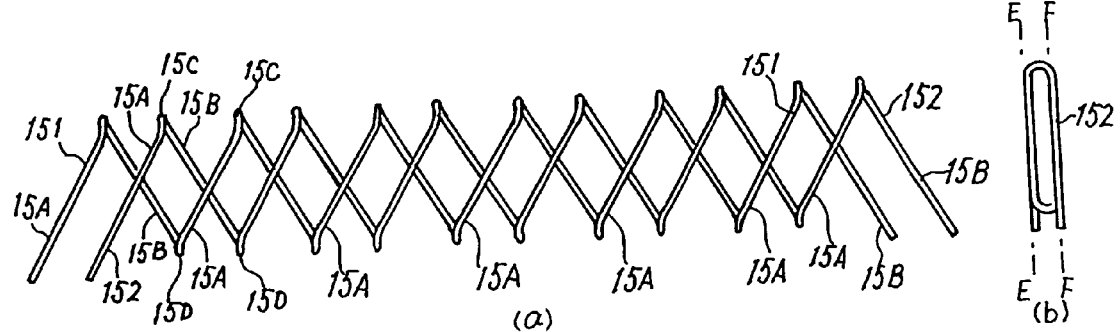

In the second embodiment, after many coil members 15 shown in FIGS. 24(a) and 24(b) have been manufactured by the winding step, one coil member 15 is woven into another. The weaving step will be described below with reference to FIGS. 25(a) and 25(b) to FIGS. 30(a) and 30(b) in which FIGS. 25(a), 26(b), ..., 30(a) are plan views and FIGS. 25(b), 26(b), ..., 30(b) are front views.

FIGS. 25(a) and 25(b) show an initial state of the weaving step. In the weaving step, one coil member 151 is woven into another coil member 152. In FIGS. 25(a) and 25(b), the coil member 151 is located on the left side and the coil member 152 is located on the right side. The first one of the straight first portion 15A from the left of the coil member 152 is positioned above the first one of the straight second portion 15B from the right of the coil member 151 so as to cross the latter. All the turning portions 15C of the coil members 151 and 152 are aligned on the top side, and all the turning portions 15D of the coil members 151 and 152 are aligned on the bottom side.

FIGS. 26(a) and 26(b) show a state that the coil member 152 has been rotated about its coil axis by 90° from the state of FIGS. 25(a) and 25(b) and advanced by a half turn toward the coil member 151. In the state of FIGS. 26(a) and 26(b), the coil members 151 and 152 are woven together by one turn. The first one of the straight first portion 15A from the left of the coil member 152 is positioned below the first one of the straight first portion 15A from the right of the coil member 151 so as to cross the latter. And the first one of the straight second portion 15B from the left of the coil member 152 is positioned above the first one of the straight second portion 15B from the right of the coil member 151 so as to cross the latter.

FIGS. 27(a) and 27(b) show a state that the coil member 152 has been rotated further about its coil axis by 90° from the state of FIGS. 26(a) and 26(b). The coil member 152 has not been advanced toward the coil member 151. The coil members 151 and 152 are woven together by one turn as in the state of FIGS. 26(a) and 26(b). In the state of FIGS. 27(a) and 27(b), whereas the turning portions 15C of the coil member 151 are located on the top side, the turning portions 15C of the coil member 152 are located on the bottom side, i.e., their turning portions 15C are located on the top and bottom sides in the converse relation.

FIGS. 28(a) and 28(b) show a state that the coil member 152 has been rotated further about its coil axis by 90° from the state of FIGS. 27(a) and 27(b) and advanced further by a half turn toward the coil member 151 from the state of FIGS. 27(a) and 27(b). In the state of FIGS. 28(a) and 28(b), the coil members 151 and 152 are woven together by 1.5 turns. The first one of the straight first portion 15A from the left of the coil member 152 is positioned above the second one of the straight second portion 15B from the right of the coil member 151 so as to cross the latter.

FIGS. 29(a) and 29(b) show a state that the coil member 152 has been rotated further about its coil axis by 90° from the state of FIGS. 28(a) and 28(b). The coil member 152 has not been advanced toward the coil member 151. The coil members 151 and 152 are woven together by 1.5 turns as in the state of FIGS. 28(a) and 28(b). In the state of FIGS. 29(a) and 29(b), all the turning portions 15C of the coil members 151 and 152 are aligned on the top side and all of their turning portions 15D are aligned on the bottom side.

As described above, the coil member 152 is progressively woven into the coil member 152 by a half turn at a time by repeatedly executing the step of rotating the coil member 152 about its coil axis by 90° and advancing the coil member 152 toward the coil member 151 by a half turn so as to increase the overlap between the coil members 151 and 152 and the step of rotating the coil member 152 further about its coil axis by 90°.

FIGS. 30(a) and 30(b) show a state that the weaving of the coil member 152 into the coil member 151 has completed. In the state of FIGS. 30(a) and 30(b), each straight first portion 15A of the coil member 152 is positioned between two adjoining straight first portions 15A of the coil member 151 in plane E-E and these all straight first portions 15A are parallel with each other. Each straight second portion 15B of the coil member 152 is positioned between two adjoining straight second portions 15B of the coil member 151 in plane F-F and these all straight second portions 15B are parallel with each other. Each straight first portion 15A of the coil member 152 is positioned above the associated straight second portion 15B of the coil member 151 so as to cross the latter, and each straight second portion 15B of the coil member 152 is positioned below the associated straight first portion 15A of the coil member 151 so as to cross the latter.

Further, in the state of FIGS. 30(a) and 30(b), all the turning portions 15C of the coil members 151 and 152 are aligned on the top side and all of their turning portions 15D are aligned on the bottom side.

FIG. 31 show a coil assembly 10 in a state that the number of eleven of other coil members 15 have been woven into one coil member 15. In the state of FIG. 31, all the first portions 15A of the twelve coil members 15 are arranged approximately parallel with each other in the first plane E-E and all the second portions 15B of the twelve coil members 15 are arranged approximately parallel with each other in the second plane F-F. The first turning portions 15C are aligned at the top side of the coil assembly 10 and the second turning portions 15D are aligned at the bottom side of the coil member 10.

<Pressing Step>

In the second embodiment, the pressing step is executed after the weaving step. In the pressing step, the coil assembly 10 that has been obtained after completion of the execution of the weaving step is pressed so that the first plane E-E where the straight first portions 15A exist and the second plane F-F where the straight second portions 15B exist come closer to each other.

Figure 32:
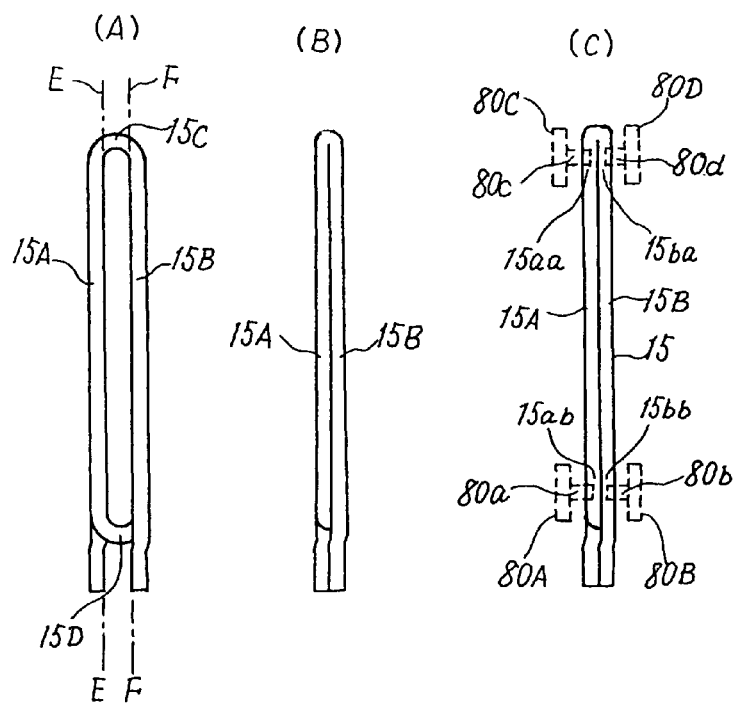
FIGS. 32(A)-32(C) illustrate a pressing step and a displacing step of the second embodiment relating to the manufacturing method of a coil assembly of a rotary electric machine according to the invention.

FIGS. 32(A) and 32(B) illustrate how the pressing step is executed. FIG. 32(A) is a plan view of the coil assembly 10 that has been obtained after completion of the execution of the weaving step. The first plane E-E where the straight first portions 15A exist and the second plane F-F where the straight second portions 15B exist are distant from and in parallel with each other. As shown FIG. 32(B), at least one of the straight first portions 15A and the straight second portions 15B are pressed against the other so as to locate the inner circumferential surfaces of the straight first and the second portions 15A and 15B in substantially the same plane, in the pressing step.

<Displacing Step>

In the second embodiment, the displacing step is executed on a coil assembly 10 obtained after completion of the execution of the pressing step. In the displacing step, after the pressing step has been executed on the coil assembly 10 shown in FIG. 31. Each coil member 15 of the coil assembly 10 is deformed so as to assume a tortoiseshell pattern as shown in FIG. 2 and each pair of coil members 15 are combined and positioned on each other as shown in FIG. 3, whereby a plurality of coil combinations 12 are formed.

In the displacing step, four movable members 80A, 80B, 80C, and 80D each having a plurality of pins are used. As shown in FIG. 32C, the movable members 80A and 80C are provided on the side of the straight first portions 15A of each coil member 15 and the movable members 80B and 80D are provided on the opposite side, that is, on the side of the straight second portions 15B of each coil member 15. The movable member 80A has a plurality of pins 80a for simultaneously moving bottom portions 15ab of the straight first portions 15A of each coil member 15, and the movable member 80B has a plurality of pins 80b for simultaneously moving bottom portions 15bb of the straight second portions 15B of each coil member 15. The movable member 80C has a plurality of pins 80c for simultaneously moving top portions 15aa of the straight first portions 15A of each coil member 15, and the movable member 80D has a plurality of pins 80d for simultaneously moving top portions 15ba of the straight second portions 15B of each coil member 15.

Figure 33:
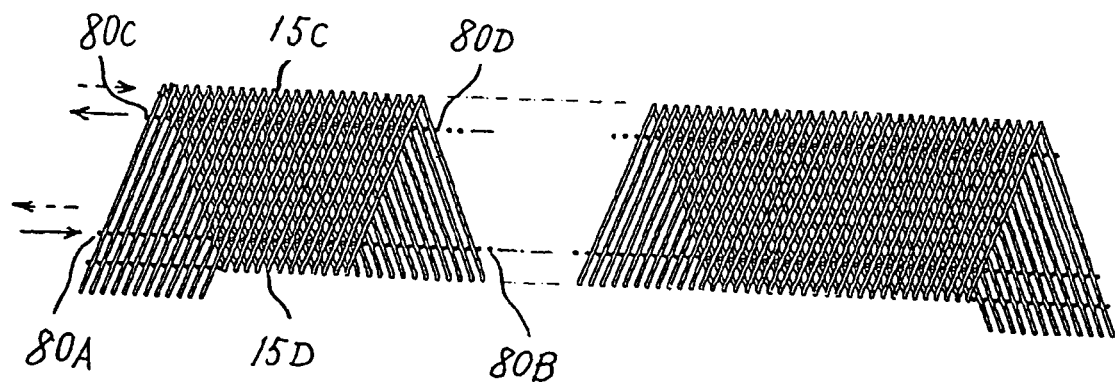
FIGS. 33 and 34 are a plan view and an explanatory diagram, respectively, illustrating a displacing step of the second embodiment relating to the manufacturing method of a coil assembly of a rotary electric machine according to the invention.
Figure 34:
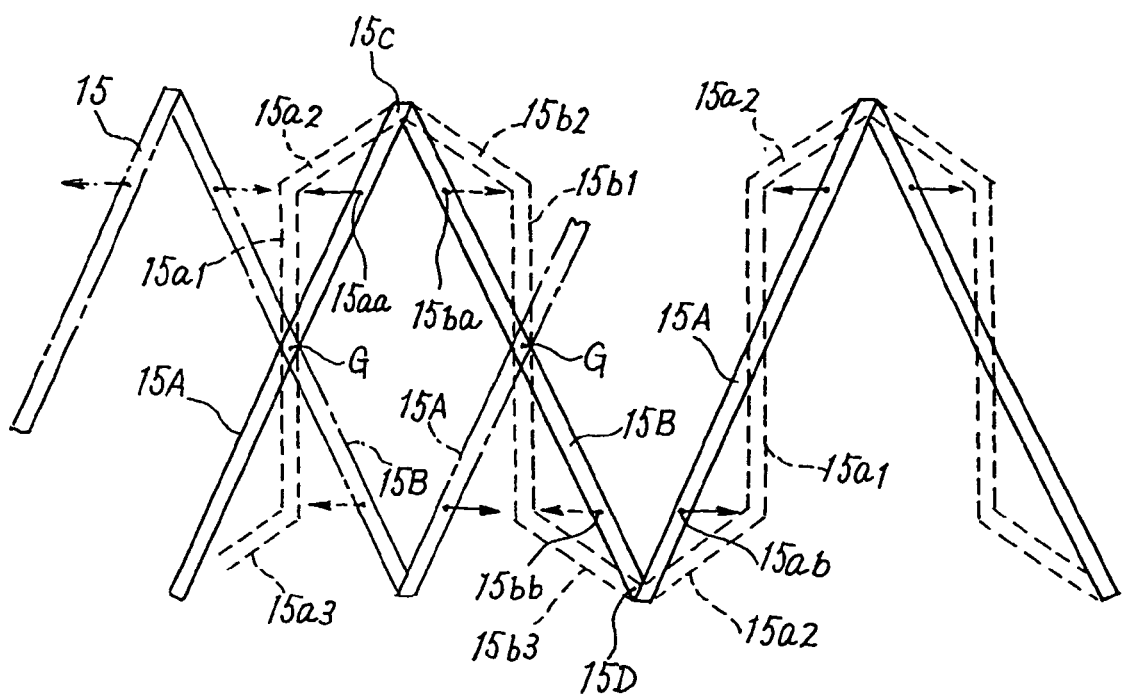

FIGS. 33 and 34 illustrate how the movable members 80A to 80D are moved. As shown in FIGS. 33 and 34, the movable member 80A is moved rightward, whereby the bottom portions 15ab of the straight first portions 15A are moved rightward by the respective pins 80a. The movable member 80B is moved leftward (i.e., in the direction opposite to the direction in which the movable member 80A is moved), whereby the bottom portions 15bb of the straight second portions 15B are moved leftward by the respective pins 80b. The movable member 80C is moved leftward, whereby the top portions 15aa of the straight first portions 15A are moved leftward by the respective pins 80c. The movable member 80D is moved rightward (i.e., in the direction opposite to the direction in which the movable member 80C is moved), whereby the top portions 15ba of the straight second portions 15B are moved rightward by the respective pins 80d. As a result of the movements of the movable members 80A to 80D, each coil member 15 is deformed from a state indicated by solid lines in FIG. 34 to a state indicated by broken lines.

As seen from FIG. 34, the top portion 15aa of each straight first portion 15A that exists in the first plane E-E is moved leftward and its bottom portion 15ab is moved rightward, whereby a first parallel straight portion 15a1 and inclined portions 15a2 and 15a3 are formed. The top portion 15ba of each straight second portion 15B that exists in the second plane F-F is moved rightward and its bottom portion 15bb is moved leftward, whereby a second parallel straight portion 15b1 and inclined portions 15b2 and 15b3 are formed. In this manner, a deformed coil member 15 as shown in FIG. 2 is formed.

Attention is now paid to a relationship between the one coil member 15 indicated by the solid lines in FIG. 34 and the another coil member 15 indicated by chain lines. Before execution of the displacing step, each straight first portion 15A of the another coil member 15 indicated by chain lines crosses the associated straight second portion 15B of the one coil member 15 indicated by the solid lines at its middle point G. After the movable members 80A to 80D have been moved, each first parallel straight portion 15a1 of the another coil member 15 indicated by the chain lines is positioned in contact with the associated second parallel straight portion 15b1 indicated by the broken lines at its above. Similarly, before execution of the displacing step, each straight second portion 15B of the another coil member 15 indicated by the chain lines crosses the associated straight first portion 15A of the one coil member 15 indicated by the solid lines at its middle point G. After the movable members 80A to 80D have been moved, each second parallel straight portion 15b1 of the another coil member 15 indicated by the chain lines is positioned in contact with the associated first parallel straight portion 15a1 indicated by the broken lines, at its below. In this manner, in the displacing step, a coil combination 12 is formed as shown in FIG. 3 in such a manner that associated parallel straight portions 15a1 and 15b1 are laid one on another.

<Inserting Step>

In the second embodiment, an inserting step in which the coil assembly 10 is inserted into the slots of a stator iron core of a rotary electric machine is executed after the displacing step. The stator iron core is developed so as to assume a flat-plate-like shape and its one surface is formed with a plurality of slots at prescribed intervals. One pair of parallel straight portions 15a1 and 15b1, laid one on another, of a coil combination 12 of the coil assembly 10 are inserted into one slot as an inner layer and an outer layer, respectively. Typically, in the one slot, the parallel straight portion 15a1 is disposed at its inner layer and the parallel straight portion 15b1 is disposed at its outer layer. Another pair of parallel straight portions 15b1 and 15a1 laid one on another, of the same coil combination 12 of the coil assembly 10 are inserted, as an inner layer and an outer layer, respectively, into another slot having a distance of N slots from the one slot. Typically, in the another slot, the parallel straight portion 15b1 is disposed at its inner layer and the parallel straight portion 15a1 is disposed at its outer layer.

After all the coil combinations 12 have been inserted into the slots in the above manner, the stator iron core is bent into a cylindrical shape so that the slots are located inside and the two ends of the stator iron core are joined to each other. Then, a connecting step is executed in which necessary internal connections are made for the coil assembly 10, that is, the ends of the coil members 15 are connected to each other properly, whereby a stator is completed.

Although in the above-described second embodiment the pressing step is executed before the displacing step, the pressing step can be executed after the displacing step.

Also in the manufacturing method of a coil assembly 10 according to the second embodiment, the length L of each of the straight first portion 15A and the straight second portion 15B of each coil member 15 is determined by the length L of the feed of the wire 17 by the wire feed mechanism 50 in the first step (FIGS. 5(a) and 5(b) and FIGS. 6(a) and 6(b)), the fourth step (FIGS. 11(a) and 11(b) and FIGS. 12(a) and 12(b)), and the seventh step (FIGS. 17(a) and 17(b) and FIGS. 18(a) and 18(b)) and hence can easily be changed by causing the setting element 23 to change the setting value of the length L. The pitch P between the first parallel straight portion 15a1 and the second parallel straight portion 15b1 of each coil member 15 is determined by the push length p of the pushing member 61 in the third step (FIGS. 9(a) and 9(b) and FIGS. 10(a) and 10(b)), the sixth step (FIGS. 15(a) and 15(b) and FIGS. 16(a) and 16(b)), and the ninth step (FIGS. 21(a) and 21(b) and FIGS. 22(a) and 22(b)) and hence can easily be changed by causing the setting element 25 to change the setting value of the length p. In particular, it is possible to change the pitch P partially in a single coil combination 12. Further, since the wire 17 is turned on the common turning base surface 32, turning portions can be made smaller than in the conventional method in which a pair of plate-like winding cores are rotated.

According to the second embodiment, a coil assembly 10 can easily be formed by weaving a plurality of coil members 15 together so that their first portions 15A, second portions 15B, first turning portions 15C, and second turning portions 15D are each arranged side by side to each other. In particular, a coil assembly 10 can easily be formed by performing the weaving after a plurality of coil members 15 have been formed.

In the second embodiment, after a plurality of coil member 15 have been formed and woven together, the displacing step is executed in which a first parallel straight portion 15a1 is formed at each first portion 15A and a second parallel straight portion 15b1 is formed at each second portion 15B. Therefore, the coil members 15 can easily be inserted into the slots in a state that the first parallel straight portions 15a1 and the second parallel straight portions 15b1 are parallel with each other.

In the second embodiment, for two coil members 15, the way a first parallel straight portion 15a1 and a second parallel straight portion 15b1 that are associated with each other are positioned on each other in the above or below relationship is changed in the displacing step. Therefore, the electrical characteristics of the two coil members 15 in the slots can be made closer to each other. In particular, since the positional relationship between the two coil members 15 are changed every turn in such a manner that in a certain slot the first parallel straight portion 15a1 of a first coil member 15 serves as a first layer and the second parallel straight portion 15b1 of a second coil member 15 serves as a second layer and that in a slot that is distant from the certain slot the first parallel straight portion 15a1 of the first coil member 15 serves as a second layer and the second parallel straight portion 15b1 of the second coil member 15 serves as a first layer. The electrical characteristics can be made even closer to each other.

In the second embodiment, the ends of the coil members 15 are connected to each other after a coil assembly 10 has been inserted into an iron core. Therefore, insertion work can be performed easily and connections can easily be made for the coil assembly 10.

In the second embodiment, the pressing step is executed in which the first plane where the first portions 15A of a plurality of coil members 15 exist and the second plane where their second portions 15B are brought closer to each other. This makes it easier to bring first and second coil members 15 closer to each other in each slot. In particular, since the pressing step is executed after the weaving step and before the displacing step, the displacing step can be executed more efficiently because the two planes have been made closer to each other by the pressing step.

Embodiment 3

A third embodiment relating to the manufacturing method of a coil assembly of a rotary electric machine according to the invention will be described below with reference to FIG. 35.

The third embodiment relates to a weaving method in which after completion of execution of the winding step on one coil member 15, another coil member 15 is woven into the one coil member 15 while being formed by winding the wire 17. In FIG. 35, components and portions having the same ones in the first or second embodiment are given the same reference symbols as the latter.

Figure 35:
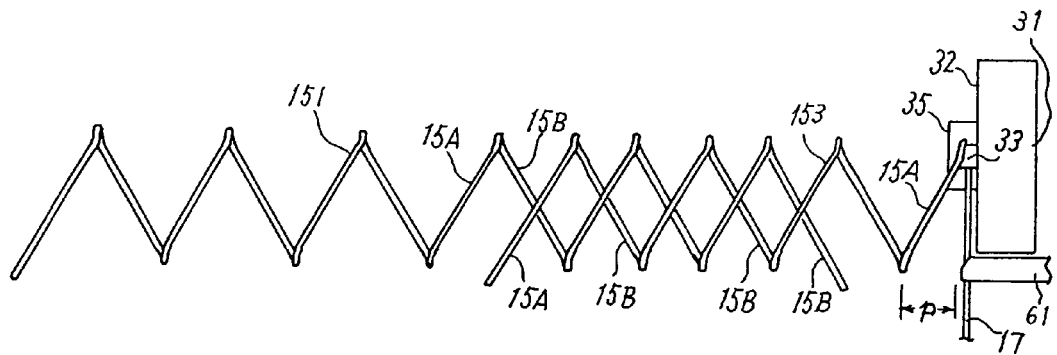
FIG. 35 is a plan view illustrating a weaving step of a third embodiment relating to the manufacturing method of a coil assembly of a rotary electric machine according to the invention.

In FIG. 35, a coil member 151 that has been obtained by executing the winding step exists on the left side and another coil member 153 exists on the right side. FIG. 35 shows a state that the coil members 151 and 153 have been woven together over only 2.5 turns. The first one of the straight first portion 15A from the left of the coil member 153 is positioned above the third one of the straight second portion 15B from the right of the coil member 151 so as to cross the latter. The fourth one of the straight first portion 15A from the left of the coil member 153 has just been pushed by the pushing member 61 so as to go away from the turning base surface 32 by the dimension p.

In the state of FIG. 35, a wire feeding step of feeding the coil member 153 upward (in FIG. 35) by the dimension L is executed in the same manner as in, for example, the fourth step shown in FIGS. 11(a) and 11(b) and FIGS. 12(a) and 12(b). Then, a turning step of forming the next turning portion 15D and second portion 15B by bending the wire 17 is executed in the same manner as in, for example, the fifth step shown in FIGS. 13(a) and 13(b) and FIGS. 14(a) and 14(b). Then, a pushing step of pushing the second portion 15B by the pushing member 61 so that it goes away from the turning base surface 32 by the dimension p is executed in the same manner as in, for example, the sixth step shown in FIGS. 15(a) and 15(b) and FIGS. 16(a) and 16(b). In the turning step among the above steps, the coil member 153 is rotated about its coil axis by 180°, whereby the first one of the straight first portion 15A from the left of the coil member 153 is positioned below the straight first portion 15A of the coil member 151 so as to cross the latter in the same manner as shown in FIGS. 27(a) and 27(b). In the ensuing pushing step, the coil member 153 is pushed toward the coil member 151 so as to be woven into the coil member 151 further by a half pitch, whereby the first one of the straight first portion 15A from the left of the coil member 153 is positioned above the next straight second portion 15B of the coil member 151 so as to cross the latter in the same manner as shown in FIGS. 29(a) and 29(b).

As described above, in the third embodiment, the coil member 153 is woven into the coil member 151 progressively while being formed by winding the wire 17. Therefore, the winding step of forming a coil member 15 and the weaving step of weaving the same coil member 15 into another coil member 15 can be executed simultaneously. This makes it possible to omit the separate weaving step and thereby simplify the process and shorten the work time.

Embodiment 4

Figure 36:
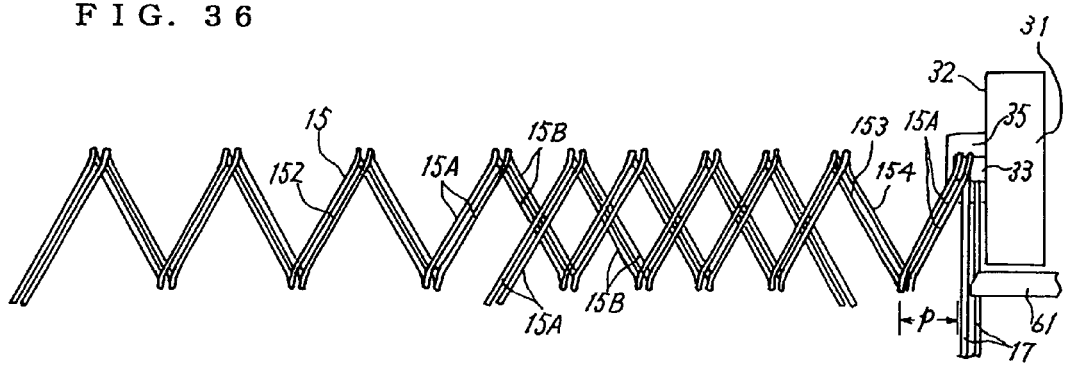
FIG. 36 is a plan view illustrating a weaving step of a fourth embodiment relating to the manufacturing method of a coil assembly of a rotary electric machine according to the invention.

A fourth embodiment relating to the manufacturing method of a coil assembly of a rotary electric machine according to the invention will be described below with reference to FIG. 36. The fourth embodiment relates to a weaving method in which a plurality of coil members 15 are woven into other coil members 15 that are already woven together while being formed by winding wires 17. In FIG. 36, components and portions having the same ones in the first, second, or third embodiment are given the same reference symbols as the latter.

In FIG. 36, coil members 151 and 152 that have been obtained by executing the winding step exist on the left side and other coil members 153 and 154 exist on the right side. In FIG. 36, the coil members 151 and 152 are already woven together as a result of execution of the winding step and the weaving step. FIG. 36 shows a state that the coil members 153 and 154 have been woven into the coil members 151 and 152 only over 2.5 turns. The first ones of the straight first portions 15A from the left of the respective coil members 153 and 154 are positioned above the third ones of the straight second portions 15B from the right of the respective coil members 151 and 152 so as to cross the latter. The fourth ones of the straight first portions 15A from the left of the respective coil member 153 and 154 have just been pushed by the pushing member 61 so as to go away from the turning base surface 32 by the dimension p.

In the state of FIG. 36, a wire feeding step of feeding the coil members 153 and 154 upward (in FIG. 36) by the dimension L is executed in the same manner as in, for example, the fourth step shown in FIGS. 11(a) and 11(b) and FIGS. 12(a) and 12(b). Then, a turning step of forming the next turning portions 15D and straight second portions 15B by bending the wires 17 is executed in the same manner as in, for example, the fifth step shown in FIGS. 13(a) and 13(b) and FIGS. 14(a) and 14(b). Then, a pushing step of pushing the straight second portions 15B by the pushing member 61 so that they go away from the turning base surface 32 by the dimension p is executed in the same manner as in, for example, the sixth step shown in FIGS. 15(a) and 15(b) and FIGS. 16(a) and 16(b). In the turning step among the above steps, the coil members 153 and 154 shown in FIG. 36 are rotated about their coil axis by 180°, whereby their first ones of the straight first portions 15A from the left of the coil member 153 and 154 are positioned below the straight first portions 15A of the coil members 151 and 152 so as to cross the latter in the same manner as shown in FIGS. 27(a) and 27(b). In the ensuing pushing step, the coil members 153 and 154 are pushed toward the coil members 151 and 152 so as to be woven into the coil members 151 and 152 further by a half pitch, whereby the first ones of the straight first portions 15A from the left of the coil members 153 and 154 are positioned above the next second portions 15B of the coil members 151 and 152 so as to cross the latter in the same manner as shown in FIGS. 29(a) and 29(b).

As described above, in the fourth embodiment, the coil members 153 and 154 are woven into the coil members 151 and 152 progressively while being formed by winding the wires 17. Therefore, the winding step of forming two coil members 15 and the weaving step of weaving the same coil members 15 into other coil members 15 can be executed simultaneously. This makes it possible to omit the separate weaving step and thereby simplify the process and shorten the work time.

Although in the fourth embodiment the method for forming the two coil members 153 and 154 simultaneously by winding the wires 17 has been described with illustration, it is possible to form more number (e.g., three or four) of coil members 15 while weaving those into other coil members 15. Although the fourth embodiment is such that coil members 15 are woven into the two coil members 151 and 152 that are already woven together, the former can be woven into a single coil member 15 or three or more coil members 15 that are already woven together.

Figure 37:
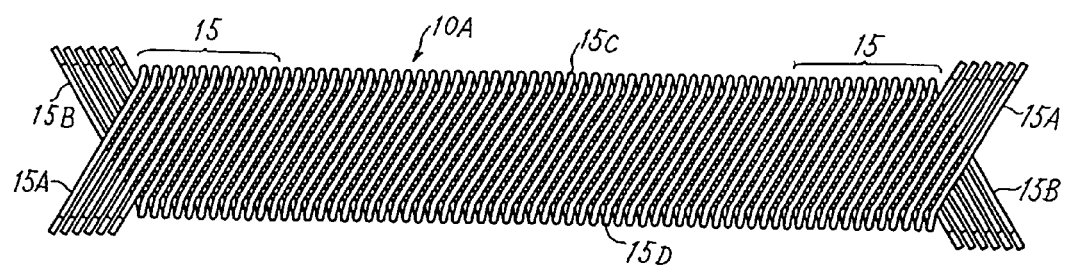
FIG. 37 is a plan view of another coil assembly obtained after completion of execution of a weaving step according to the invention.

FIG. 37 shows another coil assembly 10A obtained after completion of execution of the weaving step. The coil assembly 10A is basically the same as the coil assembly 10 shown in FIG. 31 and is different from the latter in the structures of end portions of the coil assembly. In the case of FIG. 31, in the left end portion and the right end portion of the coil assembly 10, the end portions of all the twelve coil members 15 extend downward. In contrast, in the coil assembly 10A of FIG. 37, the first portions 15A, located in the left end portion, of six coil members 15 and their second portions 15B located in the right end portion extend downward. And the second portions 15B, located in the left end portion, of the remaining six coil members 15 and their first portions 15A located in the right end portion extend upward. Such a coil assembly 10A can also be manufactured easily in short time by the method of the fourth embodiment.

Embodiment 5

Figure 38:
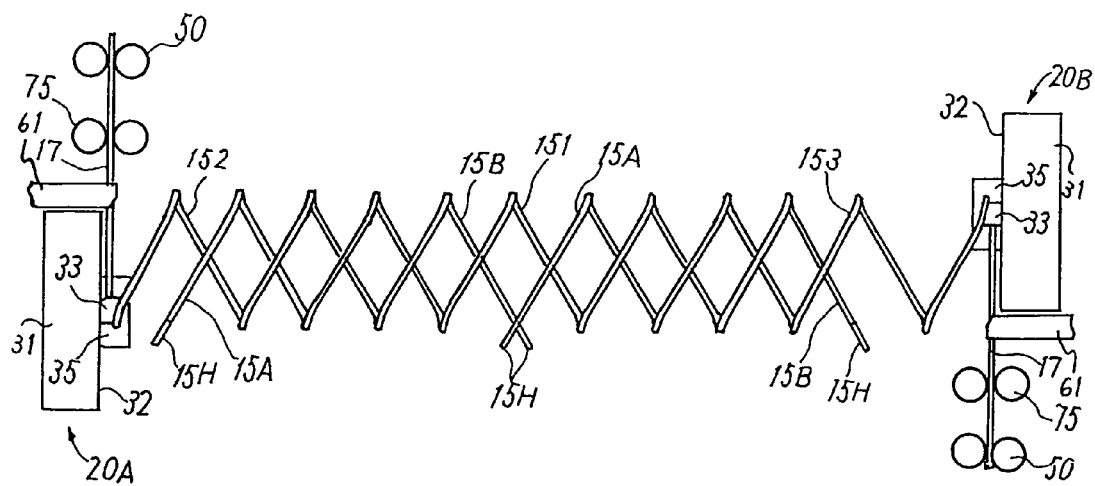
FIG. 38 is a plan view illustrating a weaving step of a fifth embodiment relating to the manufacturing method of a coil assembly of a rotary electric machine according to the invention.
Figure 39:
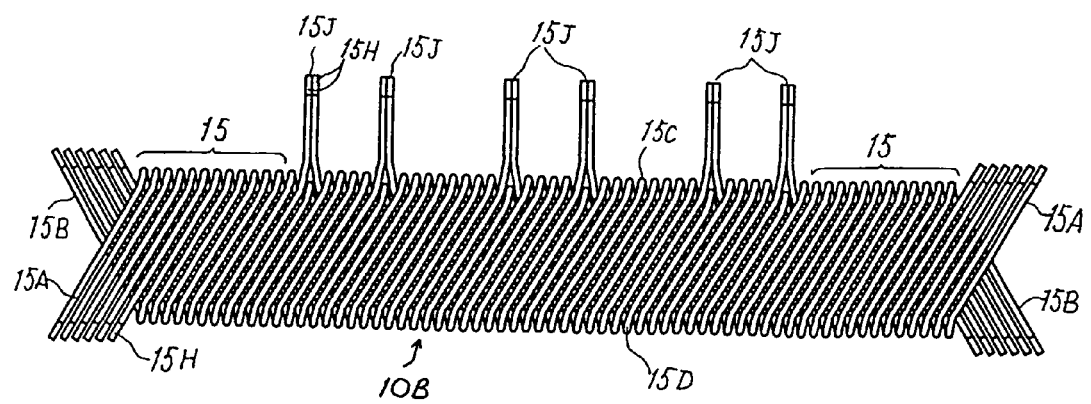
FIG. 39 is a plan view of another coil assembly obtained after completion of execution of a weaving step according to the invention.

A fifth embodiment relating to the manufacturing method of a coil assembly of a rotary electric machine according to the invention will be described below with reference to FIGS. 38 and 39. The fifth embodiment relates to another weaving method in which coil members 15 are woven into another coil member 15 while being formed by winding wires 17. In FIG. 38, components and portions having the same ones in the first, second, third, or fourth embodiment are given the same reference symbols as the latter.

As shown in FIG. 38, coil members 152 and 153 are woven, from both sides, while being formed by winding wires 17, into a coil member 151 that has already been formed by the winding step. Two winding machines 20A and 20B are used to form the coil members 152 and 153. The winding machines 20A and 20B are the same as the winding machine 20 of FIGS. 4(a) and 4(b) except that they are additionally provided with a coating peeling mechanism 75. The winding machines 20A and 20B are installed in such a manner that their turning base surfaces 32 are opposed to each other. In the state of FIG. 38, the coil member 152 has been woven into the coil member 151 from the left by 2.5 turns and the coil member 153 has been woven into the coil member 151 from the right by 2.5 turns.

In each of the winding machines 20A and 20B shown in FIG. 38, the coating peeling mechanism 75 is provided between the wire feed mechanism 50 and the pushing member 61. The coating peeling mechanism 75 peels a desired portion of the insulation coating from the wire 17 by sandwiching that portion between a pair of rollers. In the example of FIG. 38, coating-peeled portions 15H are formed at the ends of each of the coil members 151, 152, and 153 by the coating peeling mechanism 75. In each coating-peeled portion 15H, the insulation coating of the wire 17 is peeled off and the internal conductor is exposed. Among those coating-peeled portions 15H, the right-end coating-peeled portion 15H of the coil member 152 and the left-end coating-peeled portion 15H of the coil member 153, in particular, are located close to each other at the center of the coil member 151, whereby they can easily be connected to each other there. This structure of coil members is effective in forming a coil assembly 10B shown in FIG. 39. In the coil assembly 10B of FIG. 39, a plurality of connection terminals 15J are formed at its central portion. Each connection terminal 15J is formed by connecting two coating-peeled portions 15H.

The fifth embodiment is effective in forming a connection terminal 15J at the center as in the case of the coil assembly 10B. Further, two coil members 152 and 153 can be woven into another coil member 151 while being formed by the pair of winding machines 20A and 20B by winding wires 17. As such, the fifth embodiment is effective in simplifying the winding step and the weaving step.

FIG. 38 illustrates the weaving method in which the coil members 152 and 153 are woven into the coil member 151 that has been formed by the winding step from the right and left sides while being formed by winding the wires 17. Another method is possible in which the coil member 151 is omitted and the two coil members 152 and 153 are woven together while being formed by winding the wires 17. In this method, the two coil members 152 and 153 can be woven together while being formed by the two winding machines 20A and 20B. This makes it unnecessary to execute a separate weaving step.

[Embodiment Relating to Manufacturing Apparatus of Coil Member of Rotary Electric Machine]

A sixth embodiment relating to a manufacturing apparatus of coil member of a rotary electric machine will be described below.

Embodiment 6

For convenience of description, the main configuration of the winding machine 20 has been described above with reference to FIGS. 4(a) and 4(b). The configuration of the winding machine will be described again as the sixth embodiment.

Figure 40:
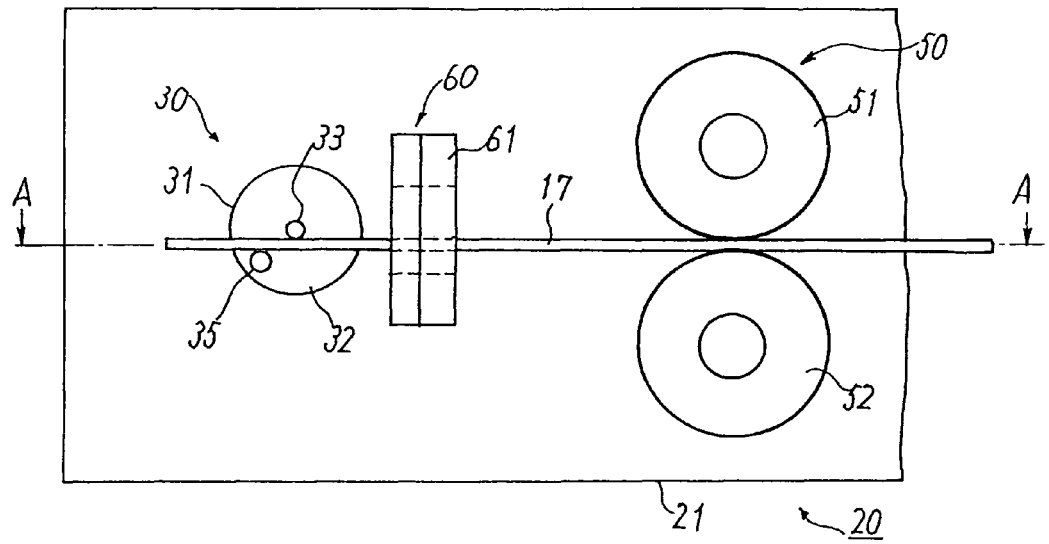
FIG. 40 is a front view showing the configuration of a winding machine (sixth embodiment) of a coil member of a rotary electric machine according to the invention.
Figure 41:
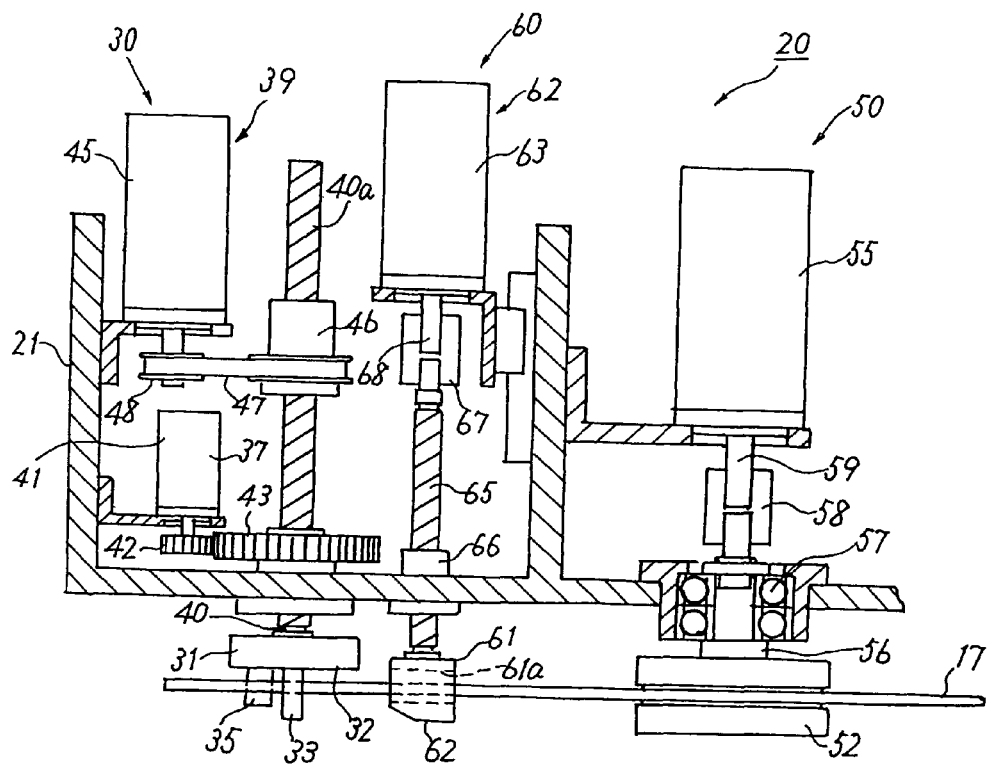
FIG. 41 is a sectional view taken along line A-A in FIG. 40.

FIG. 40 is a front view showing the configuration of the winding machine 20. FIG. 41 is a sectional view taken along line A-A in FIG. 40.

As already described above, the winding machine 20 has the turning mechanism 30, the wire feed mechanism 50, and the pushing mechanism 60. FIGS. 40 and 41 show driving mechanisms therefor together with a case 21. The rotary plate 31 of the turning mechanism 30 is attached to a rotary shaft 40 and driven by a rotational driving mechanism 37 and a rotary plate moving mechanism 39. The rotary shaft 40 penetrates through the case 21, and an electric motor 41 as the rotational driving mechanism 37 is provided inside and attached to the case 21. The electric motor 41 has, on its rotation axis, a gear 42, which is in mesh with a gear 43 that is attached to the rotary shaft 40 of the rotary plate 31. The electric motor 41 rotates the rotary plate 31 via the gears 42 and 43. The rotary plate 31 is rotated in the direction indicated by arrow A1 in FIG. 4(b) by rotating the electric motor 41 in the normal direction and is rotated in the direction indicated by arrow A2 in FIG. 4(b) by rotating the electric motor 41 in the reverse direction. The rotation angle of the rotary plate 31 can be set by setting the number of rotations of the electric motor 41.

An electric motor 45 as the rotary plate moving mechanism 39 is also provided inside and attached to the case 21. The electric motor 45 reciprocates the rotary plate 31 along its center axis in the directions indicated by arrows B1 and B2 in FIG. 4(a). The rotary shaft 40 of the rotary plate 31 has a threaded shaft 40a whose outer circumferential surface is threaded. A cylinder 46 is threadedly engaged with the threaded shaft 40a. The cylinder 46 is connected, by a belt 47, to a cylinder 48 that is attached to the rotary shaft of the electric motor 45. Rotational force of the electric motor 45 is transmitted to the belt 47 via the cylinder 48, rotates the cylinder 46, and then moves the threaded shaft 40a along its axis. As a result, the rotary plate 31 is moved along its axis. When the motor 45 is rotated in the normal and reverse directions, the rotary plate 31 is reciprocated in the directions indicated by arrows B1 and B2 in FIG. 4(a). The movement length is set by setting the number of rotations of the electric motor 45.

Next, the wire feed mechanism 50 will be described. The driving mechanism for the wire feed mechanism 50 includes an electric motor 55, which is provided inside and attached to the case 21. The electric motor 55 rotates the lower feed roller 52 of the pair of feed rollers 51 and 52. The feed rollers 51 and 52 are in elastic contact with each other with the wire 17 sandwiched in between. The wire 17 can be fed by rotating the one feed roller 52. In a state that the electric motor 55 is stopped, the wire 17 is gripped by the feed rollers 51 and 52 being sandwiched in between and its movement is suspended. The feed roller 52 is attached to a rotary shaft 56, which is supported by the case 21 via a ball bearing 57. The rotary shaft 56 is connected to a rotary shaft 59 of the electric motor 55 by a coupler 58.

The number of rotations of the electric motor 55 determines the feed length L of the wire 17. The winding step of a coil member 15 includes the wire feeding steps (the first step shown in FIGS. 5(a) and 5(b) and FIGS. 6(a) and 6(b), the fourth step shown in FIGS. 11(a) and 11(b) and FIGS. 12(a) and 12(b), and the seventh step shown in FIGS. 17(a) and 17(b) and FIGS. 18(a) and 18(b)). The feed length L of the wire 17 in the direction indicated by arrow C is given. A setting element 23 sets the feed length L by setting the number of rotations of the electric motor 55. The feed length L can easily be changed by changing the number of rotations of the electric motor 55 by the setting element 23.

The pushing mechanism 60 for the pushing member 61 includes an electric motor 63, which is provided inside and attached to the case 21. As shown in FIGS. 40 and 41, the pushing member 61 has a cut portion 61a for establishing a supply line of the wire 17 and thereby bridges over the supply line of the wire 17. The pushing member 61 has a pushing surface 62, which is located on the front face of the supply line of the wire 17. The winding step of a coil member 15 includes the turning steps (the second step shown in FIGS. 7(a) and 7(b) and FIGS. 8(a) and 8(b), the fifth step shown in FIGS. 13(a) and 13(b) and FIGS. 14(a) and 14(b), and the eighth step shown in FIGS. 19(a) and 19(b) and FIGS. 20(a) and 20(b)), a first portion 15A and a second portion 15B as well as turning portions 15C and 15D are formed in these turning steps. The first portion 15A or the second portion 15B is brought out so as to extend to immediately in front of the pushing surface 62, and is pushed by the pushing member 61 in the ensuing pushing step.

The pushing member 61 is attached, via a bearing, to a threaded shaft 65 whose outer circumferential surface is threaded, and hence is not rotated even when the threaded shaft 65 is rotated. The threaded shaft 65 penetrates through the case 21 with a cylinder 66 interposed in between, and is connected to a rotary shaft 68 of the electric motor 63 via a coupler 67. The internal circumferential surface of the cylinder 66 constitutes a threaded hole that is threadedly engaged with the threaded shaft 65. When rotated, the threaded shaft 65 is moved in its axial direction. As the threaded shaft 65 is moved in its axial direction, the pushing member 61 is moved along the axis of the rotary plate 31. By rotating the electric motor 63 in the normal and reverse directions, the pushing member 61 is reciprocated in the directions indicated by arrows D1 and D2 in FIG. 4(*a*) by the dimension p. The push dimension p of the pushing member 61 is determined by the number of rotations of the electric motor 65. A setting element 35 sets the push dimension p of the pushing member 61 by setting the number of rotations of the motor 63. The push dimension p can easily be changed by changing the setting value of the setting element 35.

The operation of the winding machine 20 shown in FIGS. 40 and 41, which was described above in detail with reference to FIGS. 5(*a*) and 5(*b*) to FIGS. 22(*a*) and 22(*b*), will be summarized below. The following three steps, that is, the wire feeding step, the turning step, and the pushing step, are executed in this order repeatedly, whereby a straight first portion 15A, a first turning portion 15C, a straight second portion 15B, and a second turning portion 15D are formed in the wire 17 and the straight first portion 15A and the straight second portion 15B are pushed aside.

(1) Wire Feeding Step

The wire feeding step is represented by the first step shown in FIGS. 5(*a*) and 5(*b*) and FIGS. 6(*a*) and 6(*b*), the fourth step shown in FIGS. 11(*a*) and 11(*b*) and FIGS. 12(*a*) and 12(*b*), and the seventh step shown in FIGS. 17(*a*) and 17(*b*) and FIGS. 18(*a*) and 18(*b*). In the wire feeding step, all of the operation that the electric motor 41 rotates the rotary plate 31, the operation that the electric motor 45 reciprocates the rotary plate 31 in its axial direction, and the operation that the electric motor 63 pushes the pushing member 61 are suspended. In this state, the electric motor 55 drives the feed roller 52 of the wire feed mechanism 50, whereby the wire 17 is fed, through the shaping gap 36, in the direction indicated by arrow C by the dimension L that is set by the setting element 23.

This operation sets a portion having the length L to become a straight first portion 15A or a straight second portion 15B.

(2) Turning Step

Figure 20:
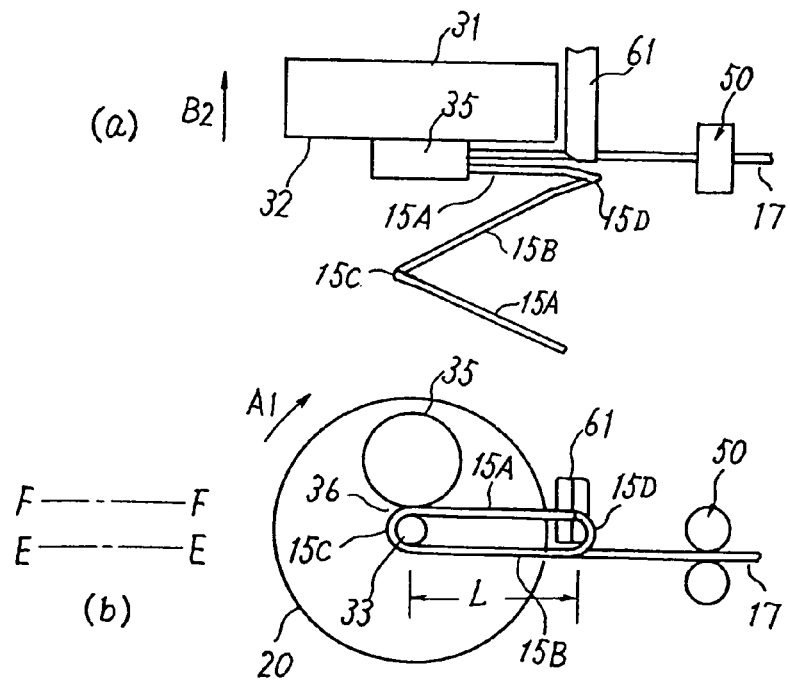

The turning step is represented by the second step shown in FIGS. 7(*a*) and 7(*b*) and FIGS. 8(*a*) and 8(*b*), the fifth step shown in FIGS. 13(*a*) and 13(*b*) and FIGS. 14(*a*) and 14(*b*), and the eighth step shown in FIGS. 19(*a*) and 19(*b*) and FIGS. 20(*a*) and 20(*b*). In the turning step, the feed of the wire 17 by the electric motor 55 (wire feed mechanism 50) is suspended and the wire 17 is gripped by the feed rollers 51 and 52 being sandwiched in between. The operation that the electric motor 63 pushes the pushing member 61 is also suspended. In this state, the operation that the electric motor 41 rotates the rotary plate 31 and the operation that the electric motor 45 reciprocates the rotary plate 31 in its axial direction are performed.

Driven by the electric motor 41, first the rotary plate 31 is rotated in the direction indicated by arrow A1 and the shaping roller 35 is rotated about the central shaft 33, whereby the wire 17 is bent at the shaping gap 36 on the turning base surface 32. As a result, a first turning portion 15C or a second turning portion 15D is formed. At the same time, accompanying the formation of the first turning portion 15C and the second turning portion 15D, a straight first portion 15A or a straight second portion 15B is formed for which the length L was set in the preceding wire feeding step. After the formation of the first turning portion 15C or the second turning portion 15D, the rotary plate 31 is driven by the electric motor 41 so as to rotate in the direction indicated by arrow A2 and is thereby returned to the original position.

During the above operation, the electric motor 45 reciprocates the rotary plate 31 in the directions indicated by arrows B1 and B2 (axial direction), whereby the angle of the turning portion 15C or 15D is adjusted.

(3) Pushing Step

Figure 22:
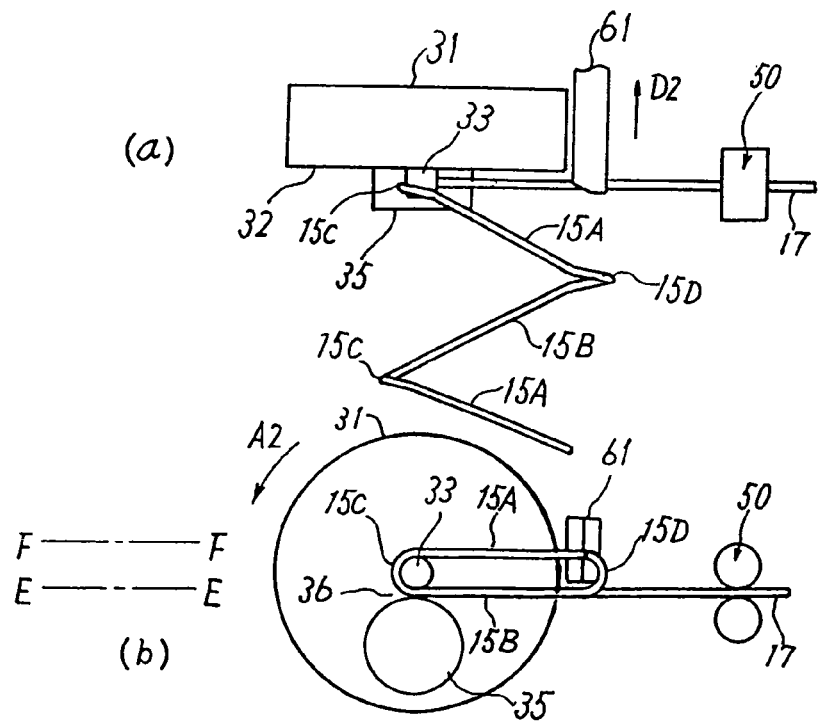

Pushing step is represented by the third step shown in FIGS. 9(*a*) and 9(*b*) and FIGS. 10(*a*) and 10(*b*), the sixth step shown in FIGS. 15(*a*) and 15(*b*) and FIGS. 16(*a*) and 16(*b*), and the ninth step shown in FIGS. 21(*a*) and 21(*b*) and FIGS. 22(*a*) and 22(*b*). In the pushing step, both of the operation that the electric motor 41 rotates the rotary plate 31 and the operation that the electric motor 45 reciprocates the rotary plate 31 in the axial direction are suspended. The wire feeding operation by the electric motor 55 is also suspended, and hence the wire 17 is gripped by the feed rollers 51 and 52 being sandwiched in between. In this state, driven by the electric motor 63, the pushing member 61 is reciprocated in the directions indicated by arrows D1 and D2 (axial direction of the rotary plate 31), whereby the straight first portion 15A or the straight second portion 15B is pushed in the axial direction of the rotary plate 31 by the prescribed dimension p that is set by the setting element 25 so as to go away from the turning base surface 32.

The coating peeling mechanism 75 is added to the wiring machine 20 if necessary. The coating peeling mechanism 75 is disposed on the wire supply line between the wire feed mechanism 50 and the pushing member 61 and attached to the case 21. The coating peeling mechanism 75 is used for forming coating-peeled portions 15H in the wire 17 at necessary positions. For example, the coating peeling mechanism 75 is used effective for forming connection terminals 15J in a coil assembly as shown in FIGS. 38 and 39.

According to the winding machine 20 of the sixth embodiment, the length L of each of the straight first portion 15A and the straight second portion 15B can easily be changed by changing the setting length L of the setting element 23. The push pitch p of the straight first portion 15A or the straight second portion 15B can also be changed easily by changing the setting value p of the setting element 25. In addition, the push pitch p can easily be changed partially even during formation of a coil member 15.

In the winding machine 20 of FIGS. 40 and 41, the central shaft 33 as well as the shaping roller 35 is attached to the rotary plate 31. Therefore, the attachment structures of the central shaft 33 and the shaping roller 35 are simplified, and the dimension of the shaping gap 36 between the central shaft 33 and the shaping roller 35 is kept constant, which makes it possible to form a coil member 15 more correctly.

In the winding machine 20, each of a first turning portion 15C or a second turning portion 15D is formed in a state that the wire 17 is gripped by the wire feed mechanism 50. Therefore, the turning portions 15C and 15D can be formed more reliably and correctly. Further, since the rotary plate moving mechanism 39 is provided to move the rotary plate 31 in its axial direction, the inclination of each of the turning portions 15C and 15D can easily be adjusted. In the case where the coating peeling mechanism 75 is provided, coating-peeled portions 15H can easily be formed in a coil member 15 at prescribed positions and intermediate connection terminals 15J, for example, can easily be formed.

[Rotary Electric Machine Using Coil Assembly According to the Invention]

Figure 42:
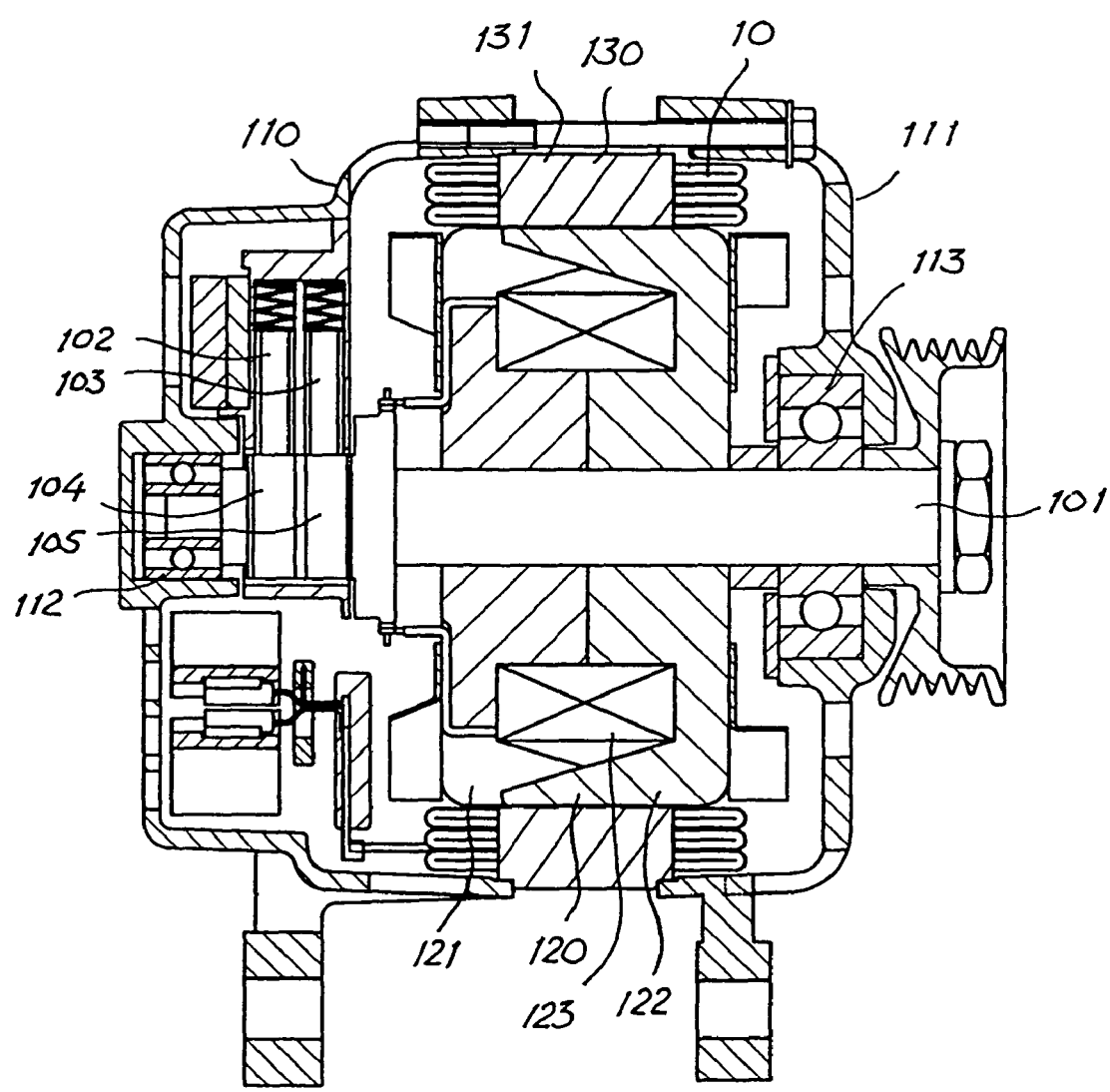
FIG. 42 is a sectional view of a rotary electric machine using a coil assembly according to the invention.

FIG. 42 is a sectional view of an exemplary rotary electric machine using a coil assembly 10, 10A, or 10B that has been manufactured according to the invention.

This rotary electric machine is an AC generator that is mounted on a vehicle, and is used for charging a battery of the vehicle, supplying power to various electric loads on the vehicle, and other purposes. The AC generator has a rotary shaft 101, a pair of brackets 110 and 111, a rotor 120, and a stator 130. The rotor 120 has a pair of rotor iron cores 121 and 122 and a rotary coil 123. Being a field coil, the rotary coil 123 is excited by a pair of brushes 102 and 103 and slip rings 104 and 105 that are provided on the rotary shaft 101. The rotary shaft 101 is supported by the pair of brackets 110, 111 via bearings 112 and 113.

The stator 130 has an annular stator iron core 131 and a coil assembly 10 that are provided around the rotor 120. The inner circumferential surface of the stator iron core 131 is formed with a lot of slots at prescribed intervals, and coil combinations 12 of the coil assembly 10 are inserted in the slots. More specifically, associated first and second parallel straight portions 15a1 and 15b1 of the respective coil members 15 of each coil combination 12 are inserted in the same slot. The coil assembly 10 serves as an output coil of the AC generator. When the rotary shaft 101 is driven by an engine or the like, the generator generates an AC voltage, which is converted by a rectifier, for example, into a DC voltage, which is supplied to the battery and the various electric loads.

What is claimed is:

1. A manufacturing method of a coil assembly of a rotary electric machine in which the coil assembly includes a plurality of coil members each of which is formed by a winding step of winding a wire so as to form a plurality of first portions, a plurality of second portions, a plurality of first turning portions each of which connects one of the first portions and one of the second portions that is located on one side of and adjacent to the one of first portions, and a plurality of second turning portions each of which connects one of the first portions and one of the second portions that is located on the other side of and adjacent to the one of first portions, the method comprising:

a step of setting a prescribed length L and a prescribed pitch p;

a first wire feeding step of feeding the wire onto a turning base surface formed on an end surface of a rotary plate configured to rotate about an axis running perpendicular to the end surface to thereby set a length L for one of the first portions based on the prescribed length L while the turning base surface is stationary;

a first turning step of turning, after the first wire feeding step, the wire with the turning base surface to thereby form one of the first turning portions and one of the first portions;

a first pushing step of pushing, after the first turning step, the one of first portions along an axial direction of the axis of the rotary plate so that the one of first portions goes away from the turning base surface by the prescribed pitch p while the rotary plate is stationary with respect to the axis running perpendicular to the end surface;

a second wire feeding step of feeding, after the first pushing step, the wire onto the turning base surface to thereby set a length L for one of the second portions based on the prescribed length L while the turning base surface is stationary;

a second turning step of turning, after the second wire feeding step, the wire with the turning base surface in the same direction as the wire was turned in the first turning step to thereby form one of the second turning portions and form one of the second portions between the one of first turning portions and the one of second turning portions; and a second pushing step of pushing, after the second turning step, the one of second portions along the axial direction of the axis of the rotary plate so that the one of second portions goes away from the turning base surface by the prescribed pitch p while the rotary plate is stationary with respect to the axis running perpendicular to the end surface.

2. The manufacturing method according to claim 1, wherein at least first one of the coil members and second one of the coil members are woven together so that the first portions, the second portions, the first turning portions and the second turning portions of the first one of the coil members are respectively arranged side by side with the first portions, the second portions, the first turning portions and the second turning portions of the second one of the coil members.

3. The manufacturing method according to claim 2, wherein the first one and the second one of the coil members are formed by repeatedly executing the winding step, and are then woven together.

4. The manufacturing method according to claim 2, wherein the second one of the coil members is woven, while being formed by executing the winding step, into the first one of the coil members that has been formed by executing the winding step.

5. The manufacturing method according to claim 2, wherein the first one and the second one of the coil members are woven together while being formed simultaneously by executing the winding step.

6. The manufacturing method according to claim 2, wherein the first one of the coil members and the second one of the coil members are formed on two respective turning base surfaces that are opposed to each other so as to be pushed toward each other, and are woven together.

7. The manufacturing method according to claim 2, wherein the first one of the coil members and the second one of the coil members are formed on two respective turning base surfaces that are opposed to each other so as to be pushed toward each other, and are woven into another coil member that has been formed by executing the winding step.

8. The manufacturing method according to claim 7, wherein the wires for the first one, the second one and the another of the coil members are insulated wires, and wherein insulation coatings are peeled from the insulated wires at prescribed positions while the first one and the second one of the coil members are formed on the turning base surfaces, to enable formation of connection terminals in the insulated wires.

9. The manufacturing method according to claim 2, further comprising a displacing step of displacing the coil members after the coil members have been formed by winding the wires and woven together, wherein in the displacing step, first end portions of the respective first portions and first end portions of the respective second portions of each of the first one and the second one of the coil members are displaced in opposite directions, and second end portions of the respective first portions and second end portions of the respective second portions of each of the first one and the second one of coil members are displaced in opposite directions, whereby first parallel straight portions are formed at the respective first portions and second parallel straight portions are formed at the respective second portions.

10. The manufacturing method according to claim 9, wherein in the displacing step, a plurality of coil combinations are formed each of which is a combination of the first one and the second one of the coil members, and each of the plurality of coil combinations is such that the second parallel straight portions of the second one of coil members are in contact with, from below, the first parallel straight portions of the first one of the coil members, respectively, and that the first parallel straight portions of the second one of the coil members are in contact with, from above, the second parallel straight portions of the first one of the coil members, respectively.

11. The manufacturing method according to claim 10, further comprising an inserting step of inserting the coil assembly into slots of an iron core after the displacing step, wherein in the inserting step, each of the plurality of coil combinations are inserted into the slots that are formed in the iron core at a prescribed pitch in such a manner that each of the first parallel straight portions of the first one of the coil members and each of the second parallel straight portions of the second one of the coil members are inserted into a prescribed slot as a first layer and a second layer, respectively, and each of the first parallel straight portions of the second one of the coil members and each of the second parallel straight portions of the first one of the coil members are inserted into a slot that is distant from the prescribed slot by a prescribed number of pitches as a first layer and a second layer, respectively.

12. The manufacturing method according to claim 11, further comprising a connecting step of connecting ends of the coil members after the inserting step.

13. The manufacturing method according to claim 9, further comprising a pressing step of pressing the coil members so that a first plane where the first portions exist and a second plane where the second portions exist come closer to each other.

14. The manufacturing method according to claim 13, wherein the pressing step is executed after weaving the coil members together and before the displacing step.

15. The manufacturing method according to claim 1, wherein the one of the first portions is pushed parallel the axis of the rotary plate by a pushing member that extends away from a plane of the rotary plate surface.

* * * * *